Dec. 30, 1969  W. McMURRAY  3,487,289
MULTIPURPOSE POWER CONVERTER CIRCUITS
Filed April 16, 1968  10 Sheets-Sheet 1
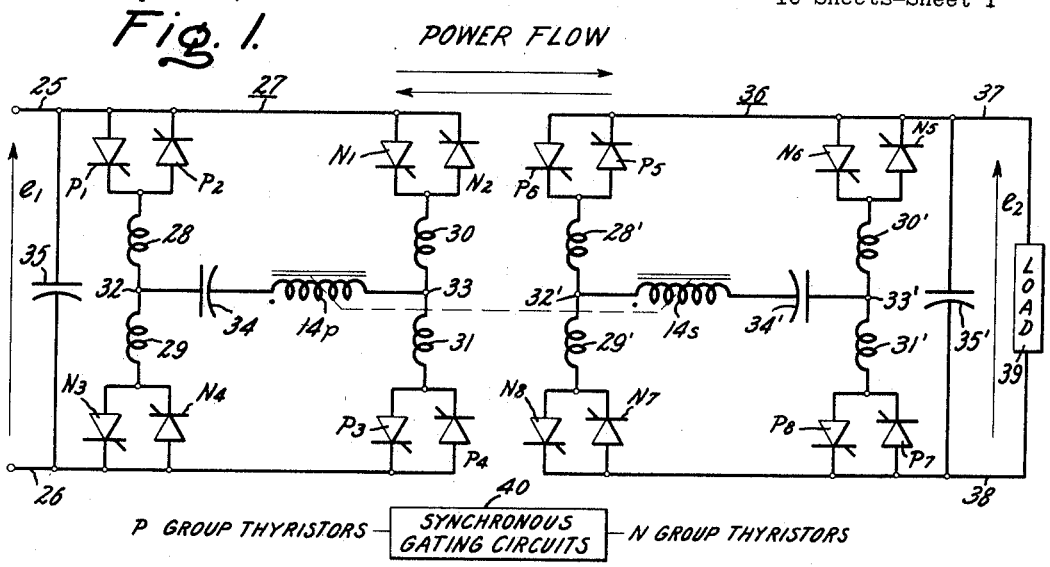
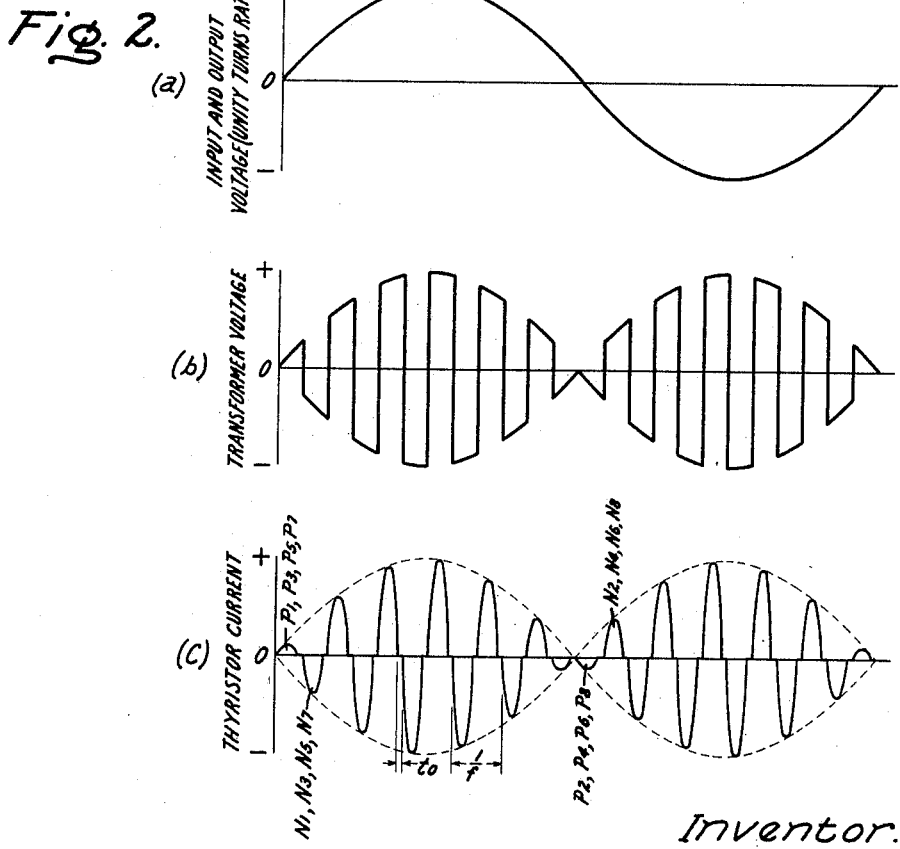
Inventor:
William McMurray,
by Donald R. Campbell
His Attorney.

Dec. 30, 1969 W. McMURRAY 3,487,289
MULTIPURPOSE POWER CONVERTER CIRCUITS
Filed April 16, 1968 10 Sheets-Sheet 2
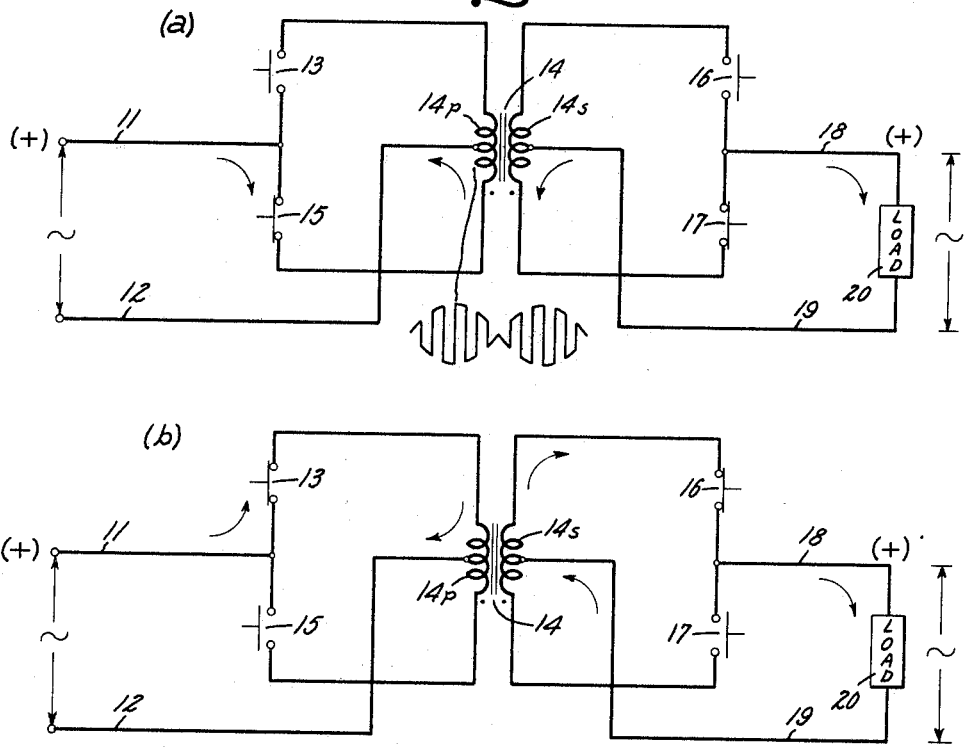
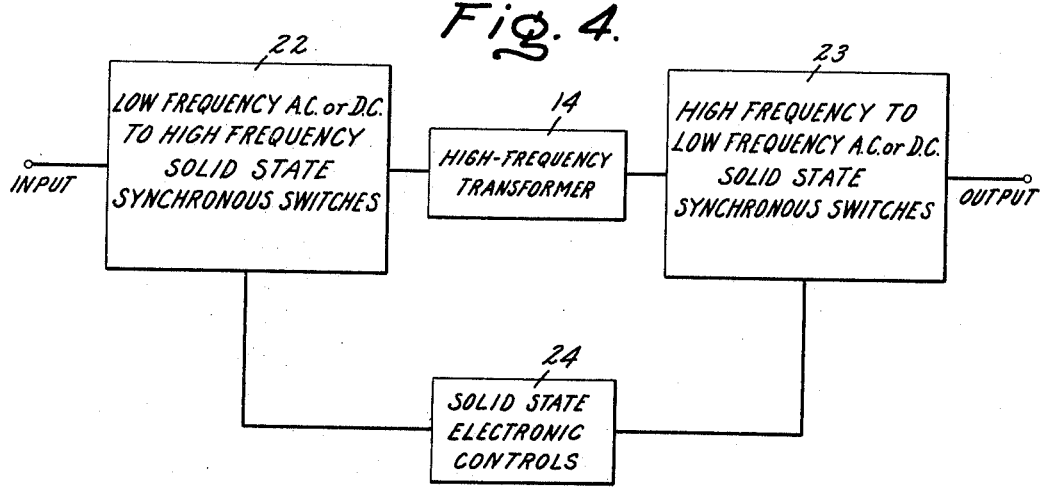
Inventor:
William McMurray,
by Donald R. Campbell
His Attorney.

Dec. 30, 1969  W. McMURRAY  3,487,289
MULTIPURPOSE POWER CONVERTER CIRCUITS
Filed April 16, 1968  10 Sheets-Sheet 3

Inventor:
William McMurray,
by Donald L. Campbell
His Attorney.

Dec. 30, 1969
W. McMURRAY
3,487,289
MULTIPURPOSE POWER CONVERTER CIRCUITS
Filed April 16, 1968
10 Sheets-Sheet 4
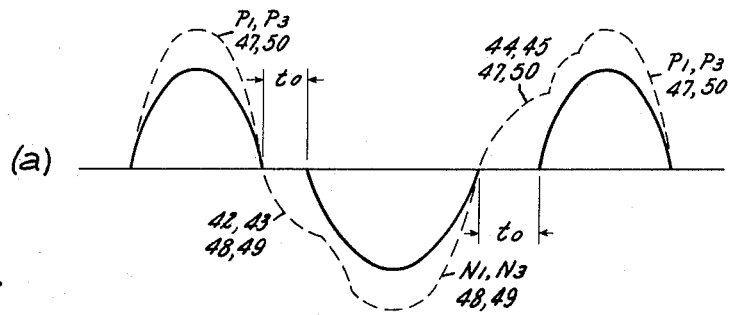
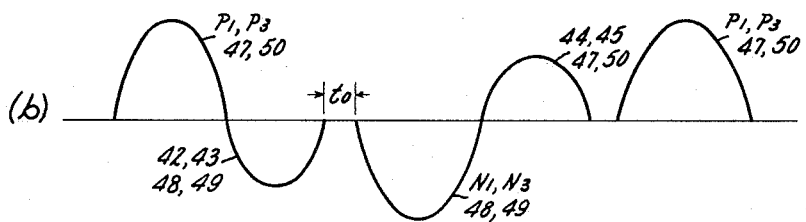
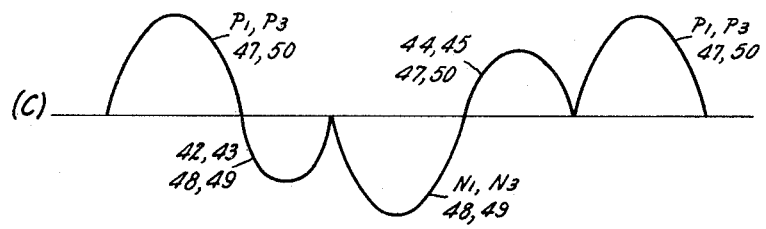
Fig. 7.
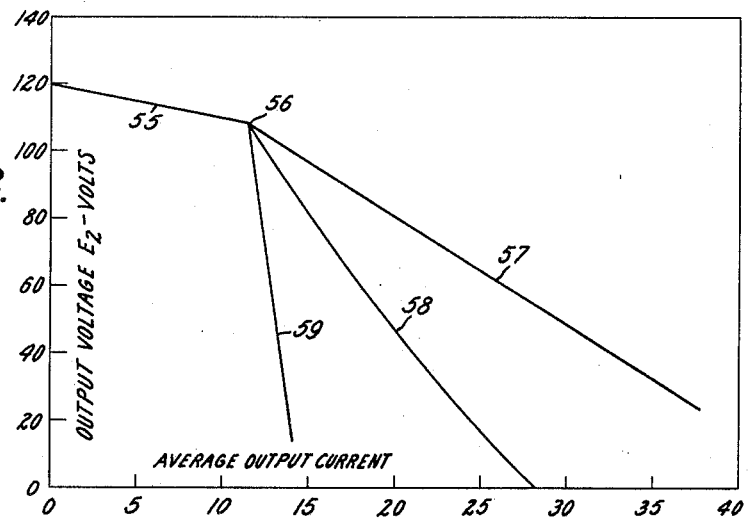
Fig. 8.
Inventor:
William McMurray,
by Donald R. Campbell
His Attorney.

Dec. 30, 1969  W. McMURRAY  3,487,289
MULTIPURPOSE POWER CONVERTER CIRCUITS
Filed April 16, 1968  10 Sheets-Sheet 5

Inventor:
William McMurray,
by Donald R. Campbell
His Attorney.

Inventor:
William McMurray.
by Donald L. Campbell
His Attorney.

Inventor:
William McMurray,
by Donald R. Campbell
His Attorney.

Dec. 30, 1969  W. McMURRAY  3,487,289
MULTIPURPOSE POWER CONVERTER CIRCUITS
Filed April 16, 1968  10 Sheets-Sheet 10
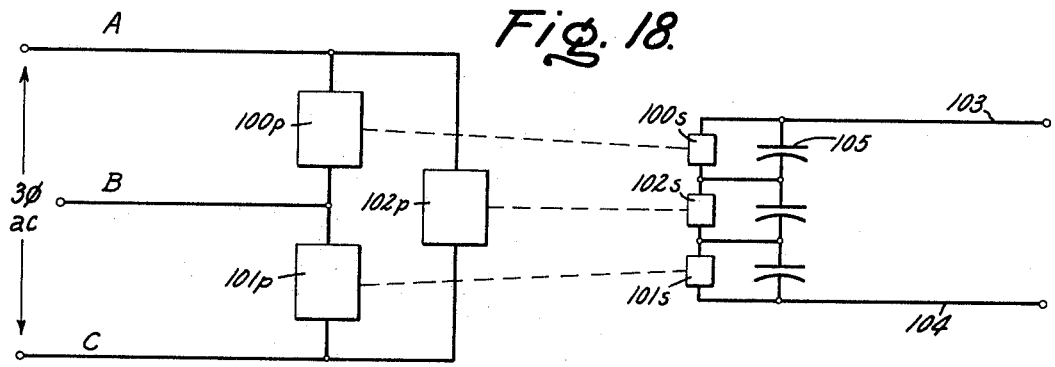
Fig. 18.
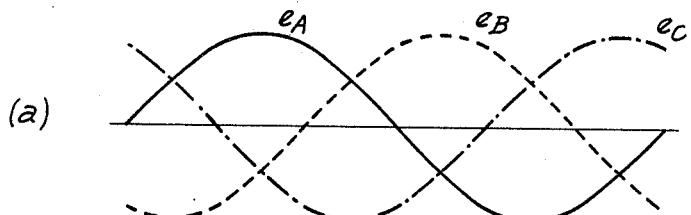
(a)
Fig. 19.
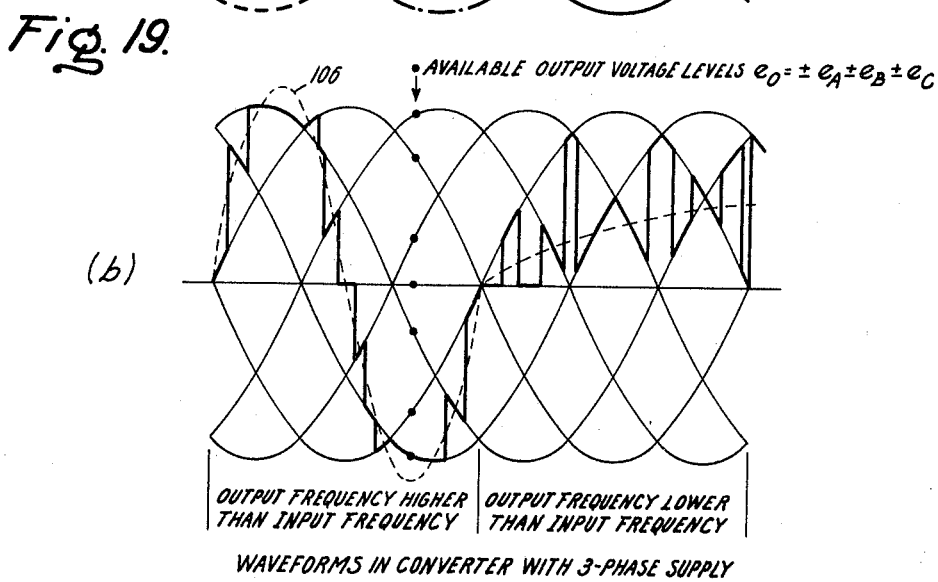
(b)
| OUTPUT FREQUENCY HIGHER THAN INPUT FREQUENCY | OUTPUT FREQUENCY LOWER THAN INPUT FREQUENCY |
WAVEFORMS IN CONVERTER WITH 3-PHASE SUPPLY
Inventor:
William McMurray,
by Donald R. Campbell
His Attorney.

United States Patent Office 3,487,289
Patented Dec. 30, 1969

3,487,289
MULTIPURPOSE POWER CONVERTER CIRCUITS
William McMurray, Schenectady, N.Y., assignor to General Electric Company, a corporation of New York
Filed Apr. 16, 1968, Ser. No. 721,664
Int. Cl. H02m 5/16, 7/48, 7/72
U.S. Cl. 321—45
25 Claims

ABSTRACT OF THE DISCLOSURE

A family of single phase and polyphase solid state converter circuits have a high frequency transformer link whose windings are connected respectively to the load and to the D-C or low frequency A-C source through series capacitor commutated inverter configuration switching circuits employing bidirectional conducting thyristor means (such as inverse-parallel connected SCR's) as the switching devices. A filter capacitor is usually connected across the input and output terminals. By synchronously rendering conductive one thyristor means in each of the primary and secondary side circuits, and alternately rendering conductive another thyristor means in each switching circuit, the input potential is converted to a high frequency wave, transformed, and reformed with 0° or 180° phase shift. Polarity inversion of the input potential is achieved by reversing the filter capacitor voltage on the output side. The converter circuit can be operated as an electronic transformer, an inverter, and a cycloconverter in both normal and current limiting modes. For operation from a D-C source only, some of the thyristors can be replaced by diodes.

---

A concurrently filed application by the same inventor and assigned to the same assignee as the present invention Ser. No. 721,817 discloses and claims similar power converter circuits suitable only for solid state switching devices which are rendered nonconductive by a control electrode signal. Another concurrently filed application by Jerry L. Stratton assigned to the same assignee, Ser. No. 721,643, discloses and claims the broad concept of this type of power converter circuit having an alternating current input and output.

This invention relates to power converter circuits, and more particularly to a family of multipurpose power converter circuits employing solid state thyristors as the current switching devices. These converter circuits have a high frequency transformer coupling link and are operable in different ways to function as an electronic transformer for a D-C supply or a low frequency A-C supply, as an inverter, and as a cycloconverter.

The power converter circuits herein disclosed comprise basically a plurality of solid state switches connected to the windings at each side of a high frequency transformer. The solid state switches on the primary side of the transformer are operated in inverter fashion to convert the low frequency A-C or D-C supply voltage waveform to a high frequency, and the solid state switches on the secondary side are operated in synchronism to reconstruct the original supply waveform at the desired output voltage level for application to a load. Because of the high frequency link, only a comparatively small transformer need be used to provide the voltage transformation and isolation functions, and the presence of the solid state switches suggests the possibility of controlling them to provide other functions such as current limiting and current interruption. The implementation of this type of power converter circuit with solid state switches such as the transistor or gate turn-off thyristor, which can be easily turned off or rendered nonconductive without regard to the power circuit voltage and current by applying a signal to a control electrode, permits the switches on the primary side and secondary side to be operated in exact synchronism so that there is always a closed path from the supply to the load. Although the converter circuit constructed in this way has desirable simplicity, the aforementioned gate turn-off semiconductors and others which employ a control electrode turn-off mechanism are capable at present of handling only low power levels, and for higher power levels it is necessary to employ thyristors such as the silicon controlled rectifier.

The thyristor is very easy to turn on, i.e., to switch it from its high impedance state in which it blocks the passage of current to its low impedance state in which it permits the passage of current, but it is comparatively difficult to turn off or return to its blocking condition. Once the thyristor has been gated into conduction, the gating mechanism loses control over the device and in order to turn off or commutate off the device it is necessary for the external circuit to reduce the current to zero and then apply a reverse voltage to the device for a short interval of time known as the turn-off period. Whether the supply voltage being transformed is a D-C voltage or a low frequency A-C voltage (for example less than 400 Hz.), the high frequency link operates at a sufficiently high frequency (for example 10 kHz.) that the supply appears to the high frequency switches as a direct current voltage, and commutation circuits are required for the thyristors. The commutation circuit is an integral part of the power circuit itself, rather than being a part of a separate control circuit as was the case with transistors and the like, and includes a form of energy storage which is ordinarily in the form of one or more commutating capacitors. The ability of commutating capacitors to generate a reverse current flow to reduce the current through a thyristor device to zero is proportional to the voltage to which the capacitors are charged prior to the initiation of commutation. It will be recalled that the solid state switches in the power converter circuit function in inverter fashion, and in most inverter circuits this voltage is proportional to the supply voltage so that commutation of high currents when the supply voltage is low is difficult. This situation occurs when a low power factor load is supplied from an alternating current source; the current is close to its maximum when the line voltage is passing through zero. Thus, the new power converter circuit using thyristors requires a different commutation scheme in which the voltage to which the commutating capacitors are charged is independent of the instantaneous supply voltage. Other desirable features of the new power circuit are brought out in the objects of the invention which follow.

An object of the invention is to provide a new and improved multipurpose power converter circuit having a high frequency transformer link which uses solid state switching devices as the current switching devices and can be built in a variety of circuit configurations.

Another object is to provide a new and improved power converter circuit having a high frequency transformer link which operates from either a D-C supply or a low frequency A-C supply and wherein the thyristors function in inverter fashion with reliable commutation over a variety of load conditions.

Yet another object is the provision of several methods for operating a power converter circuit of the foregoing type in which the thyristors are rendered conductive in different switching sequences, whereby the circuit functions for example as an electronic transformer, as an inverter, and as a cycloconverter, and which further has a current limit method of operation for the prevention of excessive current levels in the circuit.

A further object of the invention is to provide a new and improved power converter circuit employing a high frequency coupling transformer wherein the input and output thyristor circuits allow complete reversibility of power flow, are relatively simple and employ a minimum number of solid state devices and energy storage components, and wherein the control circuits for the solid state devices on either side of the transformer are the same so that the transformer behaves symmetrically.

A still further object is to provide a new and improved power converter circuit which performs as an electronic transformer with voltage transformation and isolation functions, and can be constructed and operated to include the additional functions of voltage regulation and current limiting.

In accordance with the invention, a power converter circuit comprises the combination of a high frequency linear transformer, having a pair of inductively coupled windings. A first inverter switching circuit includes at least a pair of solid state switching devices each of which is effectively connected in series circuit relationship with at least a portion of one transformer winding across a first pair of terminals in which appears an electric potential. A second switching circuit includes at least a pair of alternately conductive solid state switching devices each of which is effectively connected in series circuit relationship with at least a portion of the other transformer winding across a second pair of terminals. Means are provided for synchronously rendering conductive at least one of the devices in each of the switching circuits, and for alternately and synchronously rendering conductive at least one of the other devices in each of the switching circuits at a high frequency switching rate which is relatively high compared to the frequency of the electric potential appearing in the first pair of terminals. The first and second switching circuits further include series capacitor commutation means comprising commutating inductor means effectively coupled in series circuit relationship with commutating capacitor means and tuned to series resonance at a frequency greater than said high frequency switching rate for developing half sine wave current pulses of opposite polarity and for commutating off the devices. In this manner the electric potential appearing in the first pair of terminals is converted to a high frequency wave, transformed, and reformed in the desired manner at the second pair of terminals.

The second switching circuit is preferably an inverter configuration switching circuit employing bidirectional conducting thyristor means such as inverse-parallel connected pairs of silicon controlled rectifiers, as does the first switching circuit, so that the supply voltage can be either polarity D-C or low frequency A-C. The primary side and secondary side switching circuits making up the converter circuit can be constructed in a variety of inverter configurations, and can be operated in several modes in the nature of an electronic transformer, an inverter, and a cycloconverter, in either normal or current limiting modes of operation.

The foregoing and other objects, features, and advantages of the invention will be apparent from the following more particular description of several preferred embodiments of the invention, as illustrated in the accompanying drawings wherein:

FIG. 1 is a schematic circuit diagram of the preferred embodiment of the power converter according to the teaching of the invention in the bridge-bridge circuit configuration, which can be operated from an A-C supply or a D-C supply of either polarity;

FIGS. 2a, 2b, and 2c are characteristic waveforms for the circuit of FIG. 1 showing respectively (for a unity transformer turns ratio) the input and output voltage, the transformer voltage, and the thyristor currents (resistive load assumed);

FIGS. 3a and 3b are circuit diagrams of a simplified converter circuit to facilitate understanding the principles of operation of the new converter circuit;

FIG. 4 is a block diagram of the basic units of the new converter circuit;

Figure 5:
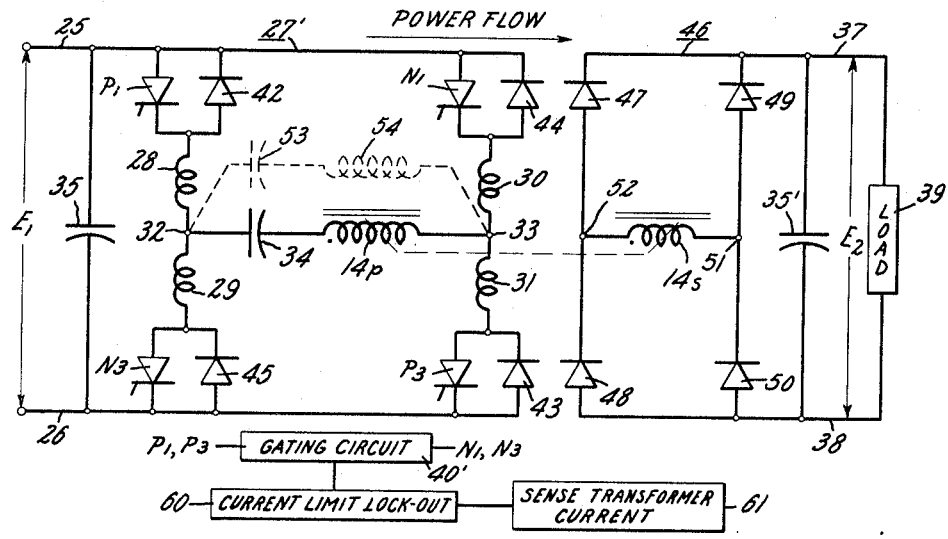
FIG. 5 is a schematic circuit diagram of a modification of the circuit of FIG. 1 showing the simplification that is effected when the circuit has a unipolarity D-C supply.
Figure 9:
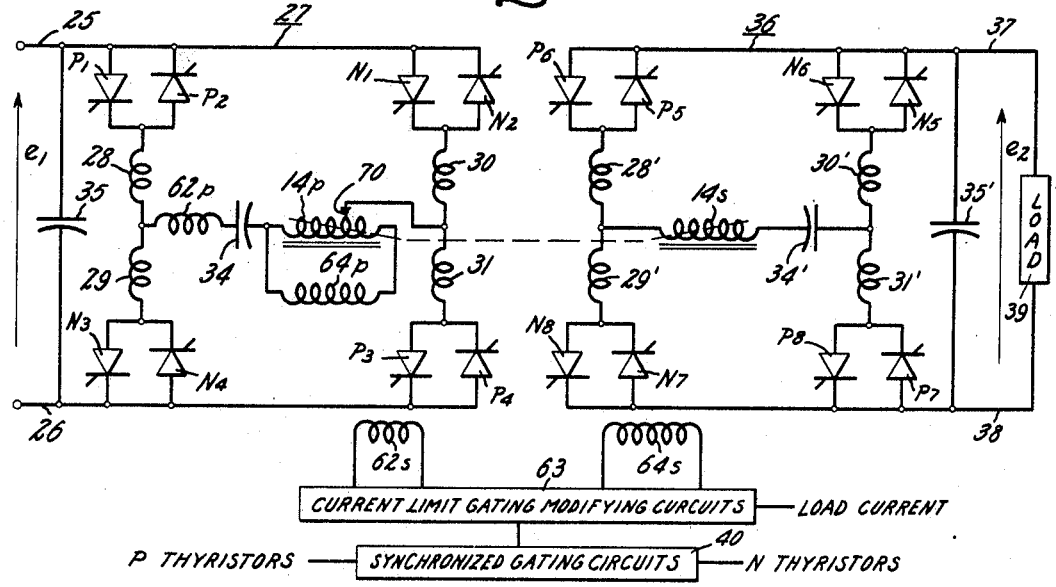
Figure 10:
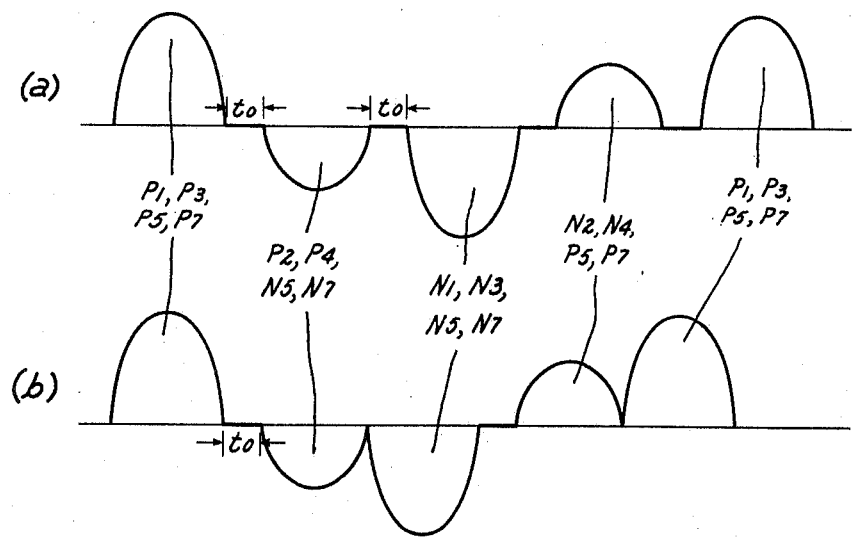
Figure 11:
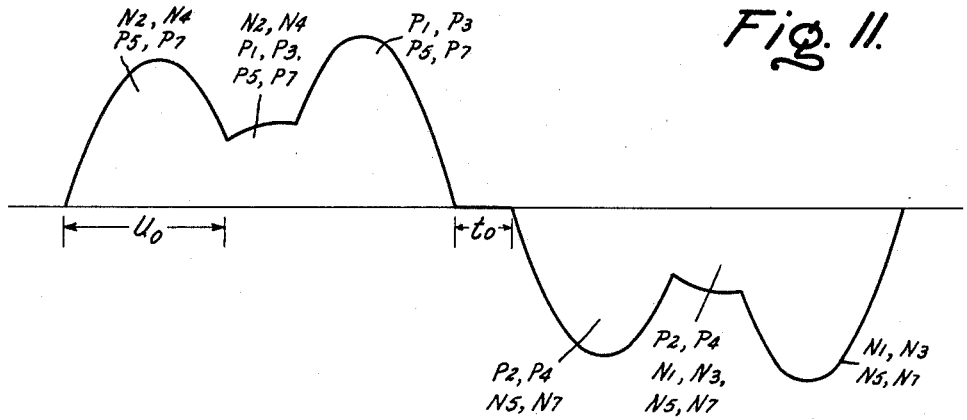
Figure 12:
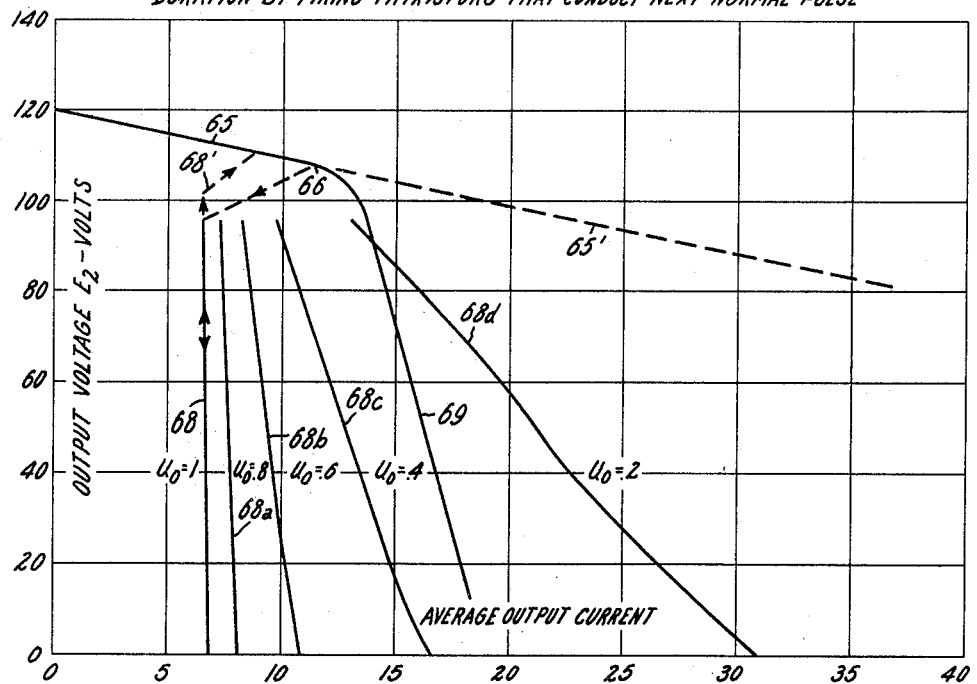
Figure 13:
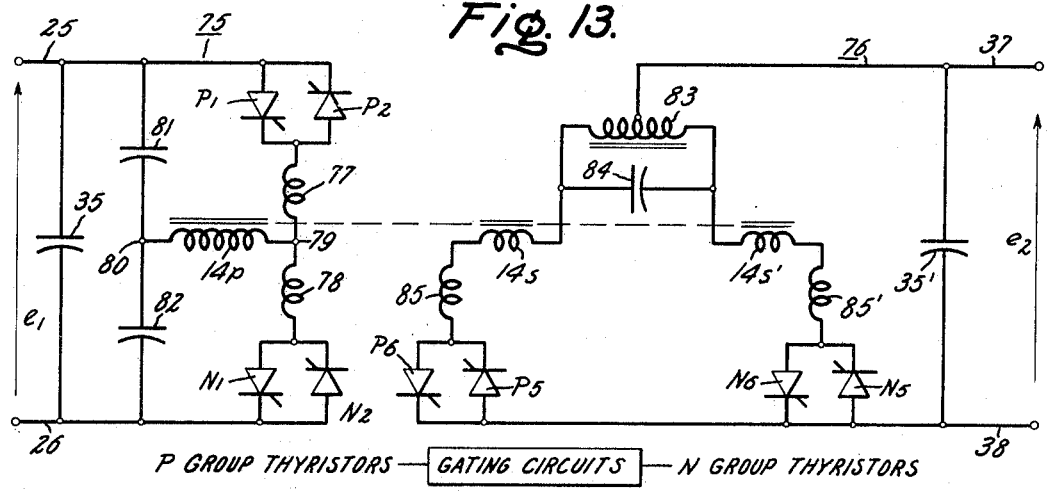
Figure 14:
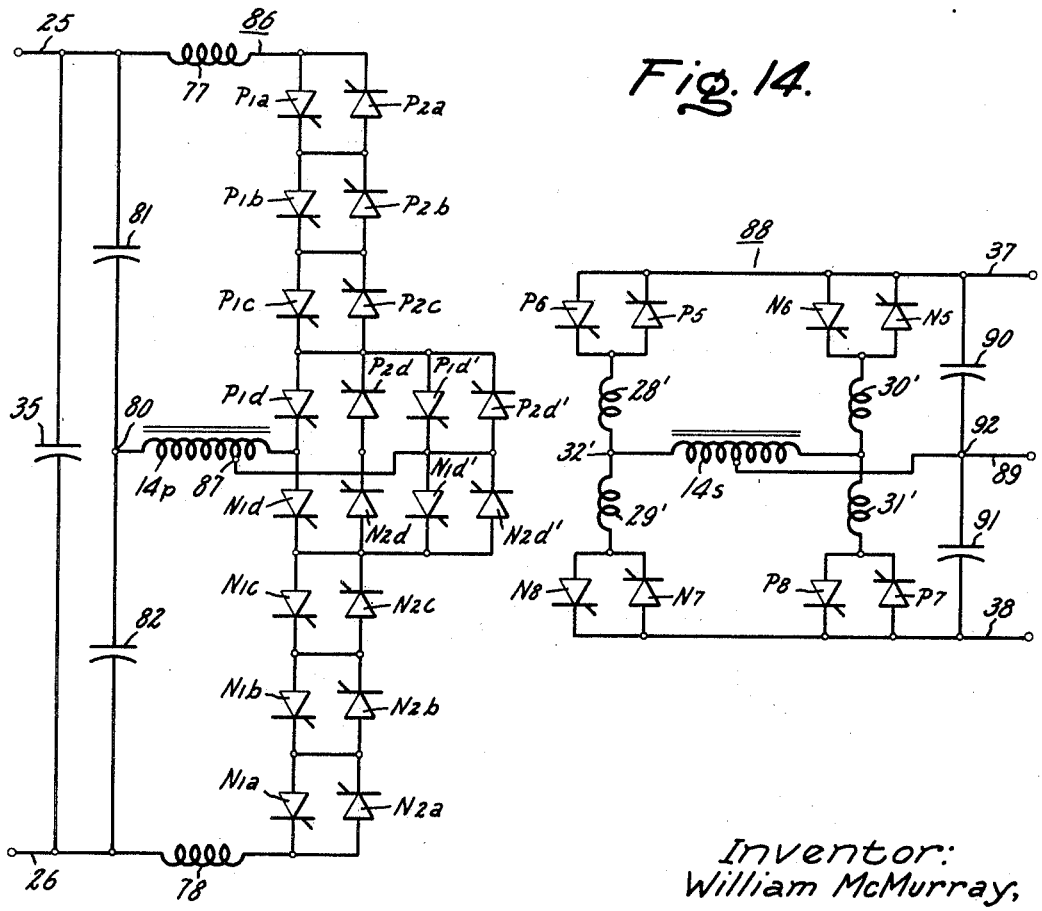
Figure 15:
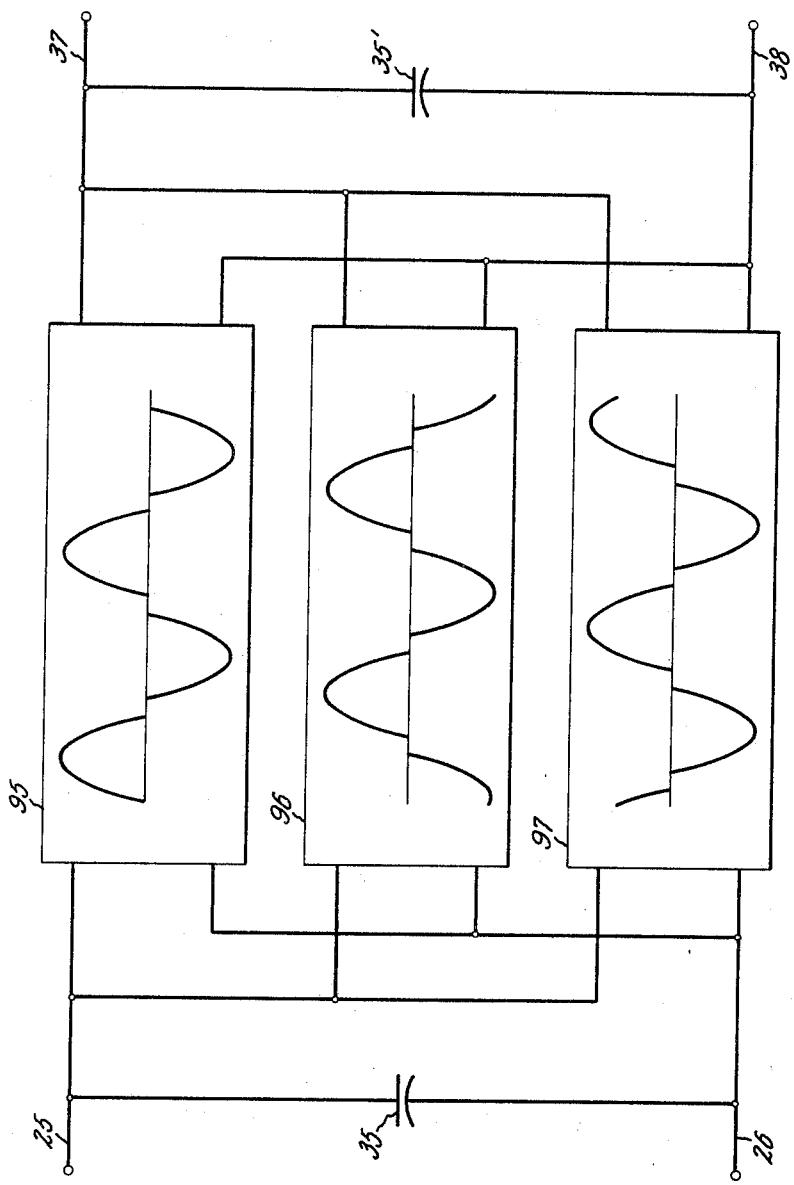

FIGS. 6a, 6b, and 6c are characteristic waveforms for the FIG. 5 circuit showing respectively the input voltage, the transformer primary voltage, and the thyristor currents on the primary side of the transformer; FIGS. 6d, 6e, and 6f show the output voltage, the transformer secondary voltage, and the diode currents on the secondary side of the transformer;

FIGS. 7a, 7b, and 7c show the current waveforms of the D-C to D-C converter circuit of FIG. 5 when operated according to three different methods in the current limit mode to return power from the commutating capacitor to the supply and limit the current delivered to the load;

FIG. 8 is a family of output voltage-current characteristics for the circuit of FIG. 5 illustrating the action of the circuit when operating in the current limit mode;

FIG. 9 is similar to the double bridge configuration of FIG. 1 for A-C or D-C supply voltages but additionally includes the modifications for operating the circuit in current limit mode and for providing for voltage regulation;

FIGS. 10a and 10b show the current waveforms for the circuit of FIG. 9 for two different methods of operating the circuit in the simple current limit mode;

FIG. 11 shows the thyristor current waveform when the FIG. 9 circuit is operated in the refined current limit mode;

FIG. 12 is a family of output voltage-current characteristics for the circuit of FIG. 9 illustrating the action of the circuit when operated in the current limit mode;

FIG. 13 is a schematic circuit diagram of a modification of the power converter circuit in which the circuit on one side is in the half bridge configuration while the circuit on the other side is in the center-tapped transformer configuration;

FIG. 14 is a schematic circuit diagram of another modification of the power converter circuit in the half bridge-full bridge circuit configuration wherein the half bridge circuit has a static tap-changing arrangement and the full bridge has a center-tapped high frequency transformer winding;

FIG. 15 is a schematic block diagram of a power converter circuit which operates from a single phase supply of voltage and has a polyphase high frequency transformer link;

FIGS. 16a and 16b are respectively input and output voltage waveforms useful in discussing a method of operating the power converter circuit of FIG. 1 as an inverter, wherein the converter circuit has a D-C supply;

FIGS. 17a, 17b, and 17c show characteristic waveforms respectively of the input voltage and output voltages produced when the converter circuit of FIG. 1 is operated as a cycloconverter, wherein the period of the output half cycles may respectively be the same or different as desired;

FIG. 18 is a block diagram of a larger converter system which includes three converter circuits operating from a three-phase supply as a frequency converter or as a form of cycloconverter; and FIGS. 19a and 19b are characteristic waveforms for the FIG. 18 circuit showing respectively the input voltages and the synthesis of the output voltages for the two cases when the frequency of the output voltage is higher than and lower than the input frequency.

Before discussing the preferred embodiment of the new power converter circuit shown in FIG. 1, the principles of operation of this new converter circuit will be explained first with regard to the simplified diagrams of FIGS. 3a and 3b and the block diagram of FIG. 4. In FIG. 3a, a low frequency alternating current source such as a commercially available 60 Hz. source is applied to the input terminals 11 and 12 of the converter circuit. The terminal 11 is connected through a first solid state switch 13, here shown as a simple switch, to one end of the primary winding 14p of a high frequency linear coupling transformer 14, and is also connected through a second solid state switch 15 to the other end of the primary winding 14p. The high frequency transformer 14 is a center-tapped transformer, and the center tap of the primary winding 14p is coupled to the other input terminal 12. On the secondary side of the transformer, the two ends of the secondary winding 14s are connected in a similar fashion through the respective solid state switches 16 and 17 to one output terminal 18, while the other output terminal 19 is coupled to the center tap of the secondary winding. A load 20 is connected across the output terminals 18 and 19.

The four solid state switches 13, 15, 16, and 17 are operated in pairs in synchronism to convert the low frequency waveform into a high frequency wave which receives the desired voltage transformation in the transformer 14 and is reconstructed on the other side of the transformer for application to the load 20. FIGS. 3a and 3b show the condition of the switches for the two half cycles of the high frequency wave, assuming that the input alternating voltage waveform is poled such that the terminal 11 is positive with respect to the terminal 12 and that for purposes of simplification the transformer 14 has a unity turns ratio. During the first half cycle of the high frequency wave as shown in FIG. 3a, switches 15 and 17 are closed synchronously, while the other two switches 13 and 16 are opened in synchronism at the same time. With switches 15 and 17 closed, the dot ends of the primary and secondary windings of the high frequency coupling transformer 14 are positive and the direction of the current through the primary side and the secondary side of the transformer are as indicated by the arrows, assuming a resistive load. It will be noted that the output terminal 18 is positive with respect to the other output terminal 19. During the other half cycle of the high frequency wave as shown in FIG. 3b, the switches 13 and 16 are closed, while the other two switches 15 and 17 are now open. Since the frequency of the high frequency wave is considerably higher than that of the low frequency source, the input terminal 11 is still positive. The polarity of the voltages in the transformer is in the other direction. On the secondary are now positive so that the current flow through the transformer is in the other direction. On the secondary side, the output terminal 18 is still positive with respect to the terminal 19 and the direction of current through the load 20 is in the same direction. Thus, the voltage magnitude and polarity applied to the load remains the same as that of the input, which in this particular instance is some slowly varying positive value. As is shown in the small diagram in FIG. 3a, the polarity of the transformer voltages changes at the high frequency switching rate, which is shown here for purposes of illustration as being 480 Hz. for a 60 Hz. input. On the other half cycle of the low frequency A-C input, the input terminal 11 will now be negative with respect to the terminal 12. Alternately closing the switches 15 and 17 synchronously and then switches 13 and 16 synchronously at the high frequency rate in like manner switches the high frequency voltage on the secondary side of the transformer so that the terminal 18 is always negative with respect to the terminal 19 and the flow of current through the load 20 during the negative half cycle is always in the other direction when the load is resistive.

The circuit when operated in this manner behaves like an electronic transformer. In addition to the voltage transformation and isolation functions provided by the high frequency transformer 14, the four switches 13, 15, 16, and 17 can be operated to obtain voltage regulation and current limit functions. When the switches 13 and 17 are closed simultaneously while the switches 15 and 16 are kept open, the polarity of the voltage across the load 20 is reversed for one-half of a high frequency cycle. This action when done in the proper manner can reduce the effective output voltage. It can serve to very quickly reduce reactive fault current in the load by reversing the voltage during peak overcurrents instead of just dropping it to zero. Assuming that the high frequency rate is very high, in the order of several kHz. or more, this action occurs in tenths of milliseconds and therefore can start to control the low frequency A-C input current very rapidly. Current interruption can also be obtained by appropriately operating these switches. If too high a current flows in the load, the switches 13 and 15 can be opened while the switches 16 and 17 are kept operating to permit reactive load current to die out, and then are opened for complete isolation. That is to say, the circuit acts as a static circuit breaker if switches 13 and 15 or switches 16 and 17 are kept opened.

It is assumed in the above discussion that the four switches 13, 15, 16, and 17 are solid state devices which can be controlled to be alternately conductive for desired intervals of time in inverter fashion. In the block diagram of this new power converter circuit shown in FIG. 4, the high frequency transformer link 14 will be noted between the circuit 22 on the primary side of the transformer and the circuit 23 at the secondary side of the transformer which as indicated both contain solid state synchronous switches. Appropriate solid state electronic controls 24 are provided to operate the switches in the primary side circuit 22 and the secondary side circuit 23 in the desired synchronous manner. The input and output voltages in addition to having a low frequency A-C value may also have a D-C value, in view of the fact that because of the high frequency switching rate of the solid state switches, the input voltage appears as a slowly varying or substantially unvarying direct current. When the solid state switches are thyristors, the high frequency link may operate for example at a rate of 10 kHz. while the input and output voltages have a frequency which is relatively low as compared to this, for example, in the range of 0–400 Hz. A voltage having a frequency of 0 Hz. is, of course, a D-C voltage.

In the diagrammatic version of the power converter circuit shown in FIGS. 3a and 3b in the center-tapped transformer circuit configuration, there is always a closed path for current to flow from one side to the other, including the transformer coupling path, so that ideally no energy storage components are required. In order to handle higher power levels, however, it is necessary that the solid state switches be thyristors either of the gate turn-on type such as the silicon controlled rectifier and the triac, or the gateless type such as the diac which can be turned on by coupling a high voltage pulse across its terminals. The power converter circuit built with these devices must necessarily include some energy storage due to the requirement of including as an integral part of the power circuit a commutation circuit for the thyristors which reduces the current through the device to zero and applies a reverse voltage to the device when it is desired to turn it off or render it nonconductive. The preferred circuit shown in FIG. 1 employs silicon controlled rectifiers as the power switches and is arranged in the full bridge circuit configuration. The silicon controlled rectifier (SCR) is a unidirectional conducting solid state switching device which can be operated at high frequency rates. Conduction through the SCR from the anode to the cathode is initiated by the application of a gating signal to the gating control electrode of the device, but thereafter the gating electrode loses control over conduction through the device and the anode potential must be made negative relative to the cathode potential in order to turn the device off and return it to its nonconducting condition.

The power converter circuit shown in FIG. 1 is operable from a low frequency A-C supply or a D-C supply of either polarity and can handle both resistance loads and reactive loads with complete reversibility of power flow so that the load can also be regenerative. At the input frequency step-up or primary side of the high frequency coupling transformer, a pair of power supply terminals 25 and 26 are connected across a source of electric potential $e_1$. The input switching circuit 27 is in the form of a bridge inverter circuit and comprises four inverse-parallel connected pairs of SCR's, hereafter referred to as thyristors, which are identified as P1–P4 and N1–N4. The first pair of inverse-parallel connected thyristors P1 and P2 are connected in series circuit relationship with a first commutating inductor 28, a second commutating inductor 29, and the second inverse-parallel pair of thyristors N3 and N4, the series circuit thus formed being connected across the power supply terminals 25 and 26. Also connected across these power supply terminals is the series circuit comprising the third pair of thyristors N1 and N2, other commutating inductors 30 and 31, and the fourth pair of thyristors P3 and P4. Between the junction points 32 and 33 between the respective pairs of commutating inductors is connected a commutating capacitor 34 which is in series circuit relationship with the primary winding 14p of the high frequency linear coupling transformer. To complete the input switching circuit 27, a filter capacitor 35 is preferably connected across the power supply terminals 25 and 26 between the source of supply and the bridge inverter circuit to smooth any variation in the supply voltage and provide a "stiff" voltage source for the inverter, i.e., a source which has low impedance at the frequency of the inverter.

If, for instance, the source of electric potential is a stable battery source, it will be appreciated the filter capacitor 35 may not be required.

The output switching circuit 36 at the secondary side of the high frequency transformer is connected across a pair of output terminals 37 and 38 between which appears the output voltage $e_2$. A load 39 is connected across these output terminals. The output frequency step-down circuit 36 is symmetrical with the input frequency step-up circuit 27 and comprises eight additional thyristors P5 to P8 and N5 to N8 connected in similar manner as inverse-parallel pairs. Thus, the first inverse-parallel pair of thyristors P5 and P6 is connected in series circuit relationship with the two commutating inductors 28' and 29' and the second pair of thyristors N7 and N8. In like manner, thyristor pair N5 and N6 is connected in series with commutating inductors 30' and 31' and the final pair of thyristors P7 and P8. The series circuit comprising the high frequency transformer secondary winding 14s and the commutating capacitor 34' is connected between the respective junction points 32' and 33' between the opposite pairs of commutating inductors.

The switching circuit 36 on the secondary side of the high frequency coupling transformer is completed by a filter capacitor 35' connected across the output terminals 37 and 38. Capacitor 35' may not be required if the load has a low impedance at the high frequency of the inverter, such as a battery being charged in the D-C case, or if an A-C load includes a capacitor. The two filter capacitors 35 and 35' are preferably an order of magnitude larger in capacitance value than the commutating capacitors 34 and 34', respectively.

The sixteen thyristors, eight on either side, included in the power converter circuit are gated into conduction in the desired order at the beginning of each high frequency half cycle by applying to the gate electrodes of the selected devices a relatively short gating pulse derived in the synchronous gating circuit 40. The synchronous gating circuit 40 is shown here in block diagram form since the details of the construction of such gating circuits having the desired firing or gating sequence is conventional as taught for example in the SCR Manual, 4th edition, published by the Semiconductor Products Department, General Electric Company, Syracuse, N.Y., copyright 1967. The normal firing sequence is that the P-group thyristors (P1 to P8) and the N-group thyristors (N1 to N8) are fired alternately in essentially the same manner as has been discussed with regard to FIGS. 3a and 3b. The gating circuits for this normal mode of operation would require, for instance, only a high frequency oscillator which toggles a bistable flip-flop to synchronize the alternate firing of the thyristor groups, a pair of buffer amplifiers driven from each of the output terminals of the flip-flop, and a gating pulse generator for each thyristor which is controlled by the appropriate amplifier. The addition of a simple circuit to lock out the oscillator when current pulses are flowing in the power circuit provides insurance against possible misfiring during severe disturbances.

As has been mentioned, the switching circuit 27 on the primary side of the high frequency transformer and the switching circuit 36 on the secondary side of the transformer are in the form of series capacitor commutated inverter configurations. Assuming that the input supply terminal 25 is positive with respect to the terminal 26, turning on all of the P-group thyristors synchronously or substantially simultaneously energizes the series resonant circuit which on the primary side comprises the inductor 28, the capacitor 34, and the inductor 31, and on the secondary side it comprises the inductor 28', the capacitor 34', and the other inductor 31' (neglecting the inductance of the transformer windings). These components collectively comprise an underdamped R-L-C series resonant circuit, the effective inductance and capacitance of which is determined by the sum of the inductances and capacitances on each side of the coupling transformer. The resistance represents the losses in the circuit. As is well known, a half sine wave of current is produced in the series resonant commutating circuit which charges the commutating capacitors 34 and 34' to a value greater than the instantaneous supply voltage $e_1$ (unity transformer turns ratio assumed). At the end of the half sinusoidal commutating pulse, the current through the conducting thyristors P1, P3, P5, and P7 has dropped to zero and they are reverse biased by the voltage on the respective commutating capacitors. After a short period of time known as the turn-off time for the thyristors, the thyristors are rendered nonconductive. The mates of these thyristors in the inverse-parallel pairs, namely, the thyristors P2, P4, P6, and P8, are not rendered conductive at the end of this high frequency half cycle because, although they are forward biased, no gating signal has been applied to their gate electrodes. On the second half of the high frequency cycle, the N-group thyristors are rendered conductive synchronously or substantially simultaneously and on the primary side there is current flow through the series resonant circuit comprising the thyristor N1, inductor 30, the commutating capacitor 34, inductor 29, and thyristor N3, while on the secondary side there is current flow flow through the series circuit between thyristors N5 and N7. For this second half of the high frequency cycle it is seen, however, that the current flow through the transformer windings 14p and 14s is in the other direction, since the no-dot ends of the windings are positive. After the passage of the half sinusoidal pulse of commutating current and following the required turn-off time, the odd N-group thyristors are turned off.

When the polarity of the supply voltage is reversed so that the input terminal 26 is positive while the terminal 25 is negative, it is the even P-group of thyristors which conducts current on one half cycle of the high frequency cycle, i.e., the thyristors P4, P2, P8, and P6. The voltage on the transformer windings 14p and 14s is now positive at the no-dot end of the windings. On the other high frequency half cycle, the even N-group thyristors are rendered conductive, and the current through the high frequency coupling transformer is in the reverse direction. Instead of using inverse-parallel conductive pairs of silicon controlled rectifiers, it will be recognized that these pairs of unidirectional conducting thyristor devices may be replaced by bidirectional conducting thyristors such as the triac and the diac. The triac is a bilateral triode thyristor, which like the silicon controlled rectifier, has a gate electrode to which a gating pulse is applied when it is desired to render the device conductive. The diac, on the other hand, does not have a gate electrode and is rendered conductive by applying a high voltage pulse or a high $dv/dt$ pulse across its load terminals or by increasing the D-C voltage to a sufficiently high level. The triac and diac devices and suitable gating circuits for them are described in the above-mentioned SCR Manual, or in United States Patents Nos. 3,353,032 and 3,353,085, assigned to same assignee as the present invention. In addition to allowing the converter circuit to operate from an A-C supply or a D-C supply of either polarity, the bidirectional conducting characteristics of the inverse-parallel pairs of SCR's or of the triac and diac are employed in a current limiting mode of operation of the converter circuit which will be described later.

The normal mode of operation of the converter circuit is better understood with reference to the waveform diagrams shown in FIG. 2 for an A-C source of potential, assuming for the sake of clarity that the transformer turns ratio is unity. FIG. 2a shows that the circuit operated in this manner acts like an electronic transformer in that at any given moment the instantaneous output voltage $e_2$ tends to be equal to the instantaneous input voltage $e_1$, and any difference between the two is due to the losses incurred in maintaining oscillation of the L-C circuit. Thus, the input and output voltage wave shapes are substantially the same, although it will be appreciated that when a load is attached to the circuit which draws current, the output voltage will be less than the input voltage and this difference in fact allows the circuit to operate. FIG. 2b shows the high frequency alternating voltage in the coupling transformer within each of the low frequency A-C supply half cycles. The half sine waves of current through the thyristors are shown in FIG. 2c for the case of a resistive load which also indicates the thyristors which are conducting when the particular half sinusoid of current is produced. On this diagram is shown the period $1/f$ of the high frequency cycle and also the turn-off period $t_o$ at the end of each high frequency half cycle. The resonant frequency $$f_0 = \frac{1}{2\pi\sqrt{LC}}$$

of the commutating circuit is higher than the chopping or switching frequency $f$, and the time $t_o$ between the current pulses of alternating polarity allows the thyristors to turn off. The high frequency switching rate $f$ is desirably as high as is practicable, in order that the high frequency coupling transformer be relatively small, and preferably is 10 kHz. or higher so that transformers made of low loss powdered iron or ferrite core materials can be used. At lower frequencies, the low saturation flux density of these materials is a drawback. A high frequency transformer further has low interwinding capacitance. For present day thyristor devices the turn-off time $t_o$ is typically in the order of 10 microseconds, and in order to maximize the efficiency of the power converter circuit the resonant frequency $f_o$ of the commutating circuit is chosen such that the half sine wave of current completely fills up the half cycle with the exception of the turn-off time.

The manner in which the commutating circuit for the new power converter circuit operates is different from that in the ordinary series capacitor commutated inverter in that the magnitude of the current pulses and the peak value of the commutating capacitor voltage are proportional to the load current only (under steady state conditions), rather than being proportional to the supply voltage as well as the load current as in the usual series capacitor commutated circuit. Although it can be shown mathematically from the equations which represent the operation of the circuit that the commutating capacitor voltage is proportional to the load current, this can also be deduced intuitively. In FIG. 1, let it be assumed that at the moment of discussion the voltages on the commutation capacitors 34 and 34' are zero. In the case that the instantaneous supply voltage $e_1$ and the instantaneous output voltage $e_2$ are exactly the same, for example 100 volts, there is no current in the circuit. But if the output voltage $e_2$ changes to 90 volts because the load 39 is drawing current, then the voltage in the primary and secondary windings 14$p$ and 14$s$ of the high frequency coupling transformer is 95 volts, and the remaining 5 volts on each side divides equally between the two commutating inductors which are energized. Thus, if the P-group thyristors are turned on, two and one-half volts appear across each of the commutating inductors 28, 31, 28', and 31' at the instant when those thyristors are turned on. This potential difference across each of the pairs of commutating inductors gives rise to a half sine wave of current which will charge each of the capacitors 34 and 34' to about 9 volts (10 volts less a typical loss of 1 volt). If the load is a larger load and draws more current so that the instantaneous output voltage $e_2$ is less than 90 volts, i.e., the load 39 draws more current, a greater magnitude of voltage appears across each of the energized commutating inductors which in turn produces more current to charge the commutating capacitors 34 and 34'. Because the amount of commutating energy which is available is proportional to the instantaneous load current, there is no problem in commutating the thyristors when the load is a reactive load and the current is heavy when the supply voltage is going through zero. Another aspect of the manner in which the new converter circuit operates is that by using the capacitive output filter 35' for the load, a "stiff" voltage sink is maintained so that the current pulse duration remains very close to $\pi\sqrt{LC}$ seconds, one-half of the natural period of the series L-C commutating circuit, and is independent of the load impedance. One problem with the usual series capacitor commutated inverter is that when the load alters the natural frequency of the commutating circuit, such that the load varies over a wide range and R in the underdamped R-L-C circuit becomes large, the current pulses last longer than $\pi\sqrt{LC}$ seconds and if one thyristor is still conducting when the other is fired, a short circuit can occur. This situation does not occur in the present circuit. As has been mentioned, it may not be necessary to use the filter capacitor 35' when for instance the load is a battery which is being charged, which is of itself a "stiff" voltage sink, however, for the usual range of resistance and reactive loads the filter capacitor is required. Both of the filter capacitors 35 and 35' are of an order of magnitude larger than the commutating capacitors 34 and 34'.

Because of the symmetrical nature of the new power converter circuit shown in FIG. 1, complete reversibility of power flow is obtained. Thus, when the load 39 is a power generating load, power may be returned through the converter circuit to the supply. Moreover, the normal mode of operation employing the normal gating sequence can be maintained when the load 39 is an inductive or capacitive load during the period in each low frequency cycle when reactive current is being fed from the load to the supply through the power converter circuit. In order to obtain complete reversibility of power flow, it is not essential that the commutating inductors and capacitors be symmetrical, since the same commutating action occurs when either some or all of the commutating inductors or the commutating capacitors are lumped together and included either in the input circuit 27 or the output circuit 36. Furthermore, the inductances may or may not be coupled and a choice of design arrangement is allowed so long as the total equivalent inductance remains constant and properly tuned with the total equivalent capacitance. It is furthermore necessary to account for the turns ratio of the high frequency coupling transformer in choosing the total equivalent inductance and capacitance. Also, the leakage inductance of the transformer must be included as part of the equivalent commutating inductance, and may contribute the major part of the commutating inductance. When there is a reverse power flow and power is returned from the load 39 to the supply, the previously designated output circuit 36 and secondary transformer winding 14s now become respectively the input circuit and the primary transformer winding, and vice versa for the circuit 27 and the transformer winding 14p at the other side of the transformer. Another advantage is that the input and output filter capacitors 35 and 35' draw leading current and contribute to power factor correction of the normal lagging power factor loads on power systems.

As has been discussed, the preferred method of gating the thyristors is to trigger into conduction all the P-group thyristors and then all the N-group thyristors. This has the advantage of simplicity since the circuit conditions will determine which individual thyristors actually conduct current. An alternative method of gating, of course, would be to gate only those thyristors which will conduct during the subsequent high frequency half cycle as determined by control logic circuits. It may also be mentioned that the new converter circuit can be implemented with transistors instead of thyristors, making the necessary circuit changes as needed. A practical reason for using series capacitor commutation with solid state devices that are capable of turn-off by means of a control electrode signal is to reduce the switching loss (or avoid the possibility of "second breakdown"). If transistors are used instead of thyristors, the turn-off period $t_0$ can be eliminated so that the transformer current is a continuous sine wave.

The basic double bridge power converter circuit of FIG. 1 can be simplified considerably when the source of supply voltage is a unipolarity direct current source. In this case the circuit becomes a D-C to D-C converter as shown in FIG. 5. The input switching circuit 27' is similar to the circuit 27 in FIG. 1 with the exception that one of the inverse-parallel connected thyristors in each pair is replaced by a feedback diode. Thus, a diode 42 is connected across the load terminals of the thyristor P1 and diodes 43, 44, and 45, are respectively connected across the load terminals of the thyristors P3, N1, and N3. The output switching circuit 46, however, is considerably different from the output circuit 36 in FIG. 1. The circuit 46 is essentially a full wave bridge rectifier and comprises a pair of similarly poled diodes 47 and 48 connected in series across the output terminals 37 and 38 with their junction point 52 connected to one end of the coupling transformer secondary winding 14s, and another pair of similarly poled diodes 49 and 50 likewise connected across the load terminals 37 and 38 and having their junction point 51 connected to the other end of the winding 14s. The filter capacitor 35' completes the output circuit 46.

The circuit in FIG. 5 is an example of the previously mentioned option wherein all of the commutating capacitance and all of the commutating inductance are included on the primary side of the coupling transformer. In an alternative arrangement of the circuit 46 on the secondary side of the D-C to D-C converter in FIG. 5, it can be similar to the secondary circuit 36 in FIG. 1 wherein all of the odd-numbered thyristors P5, P7, N5, N7 are replaced by rectifier diodes and all of the even numbered thyristors P6, P8, N6, N8 are omitted. The values of the commutating components in the primary circuit 27' in FIG. 5 would, of course, be changed to maintain the constancy of the total equivalent capacitance and inductance. While the arrangement of FIG. 5 is generally preferable, there would be an advantage in including all of the commutating capacitance in the secondary circuit when the converter is used to step up the D-C voltage from a very low voltage source of less than 20 volts, for example. In this case, the size of the commutating capacitor in the secondary circuit could be considerably smaller than its equivalent in the primary circuit, since a lower value of capacitance is required by virtue of the square of the transformer turns ratio.

Figure 6:
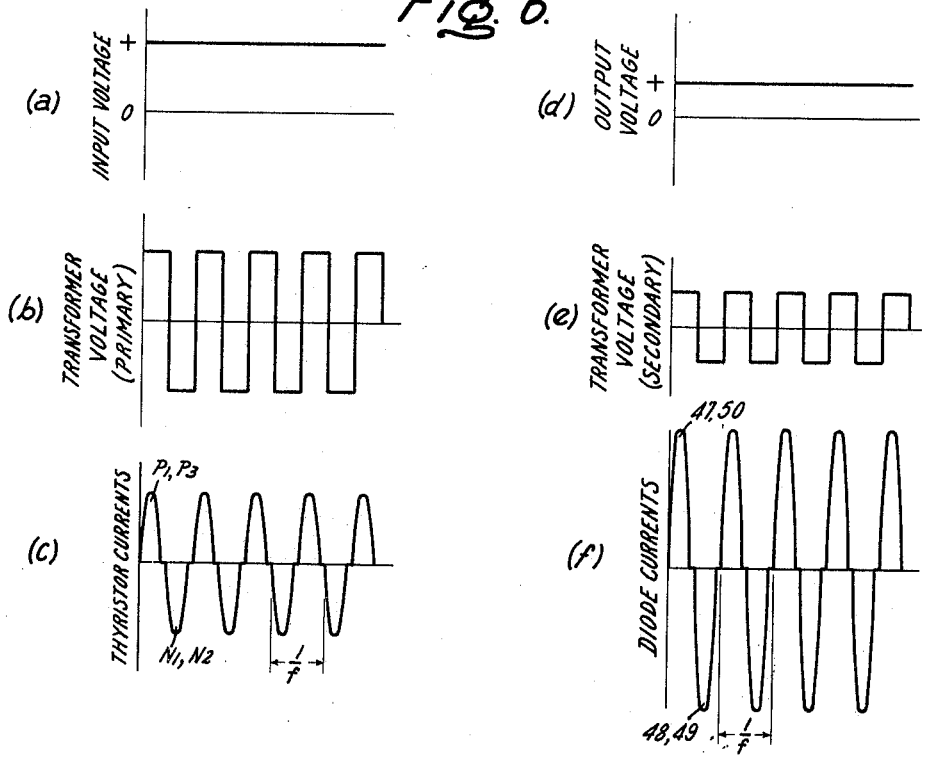

In the normal mode of operation of the D-C converter shown in FIG. 5, the gating circuit 40' alternately renders conductive thyristors P1 and P3 and then thyristors N1 and N3 at the relatively high switching frequency, and the respective pair of conducting thyristors in each high frequency half cycle are commutated off by the same series capacitor commutating mechanism previously described. During the high frequency half cycle when the thyristors P1 and P3 are conducting, the potential across the windings 14p and 14s of the high frequency coupling transformer, which in this circuit is shown having a 2:1 turns ratio, is positive at the dot end, and the diodes 47 and 50 are forward biased to switch from their high impedance condition to their low impedance condition and supply current to the load 39. On the negative half cycle of the high frequency wave when the thyristors N1 and N3 are conducting, the no-dot ends of the windings 14p and 14s are positive, and the diodes 48 and 49 are now rendered conductive to supply current to the load 39, the output terminal 37 always being positive with respect to the terminal 38. Since the diodes in the output circuit 46 are unidirectional conducting devices, power flow can be in only one direction, i.e., in the direction from the source of supply voltage to the load. The waveforms are shown in FIG. 6 assuming the 2:1 step-down turns ratio for the high frequency coupling transformer 14. Consequently, the magnitude of the input D-C voltage and the A-C voltage appearing in the transformer primary (FIGS. 6a and 6b) has twice the magnitude of the D-C output voltage and the A-C voltage in the transformer secondary (FIGS. 6d and 6e). Because of the transformer action, however, the peak amplitudes of the thyristor currents as shown in FIG. 6c is only half that of the diode currents shown in FIG. 6f.

For high impedance loads it is desirable to modify the circuit of FIG. 5 to include in the commutation circuit for the thyristors an additional L-C circuit which is tuned to approximately twice the switching frequency or slightly less than twice the resonant frequency of the previously discussed series capacitor commutation circuit comprising the commutating capacitor 34 and two of the four commutating inductors 28–31. For instance, the additional commutating elements comprising the series connected capacitor 53 and inductor 54 may be connected between the junction points 32 and 33. During the time that the original commutation components produce a half sinusoid of current, the additional commutating components 53 and 54 which are tuned to twice the switching frequency $f$ are producing two half sinusoids of commutating current, the first of which adds to the total current in the thyristors while the second has the opposite polartiy and subtracts from the total thyristor current and flows through the feedback diodes during the thyristor turn-off time $t_0$. With light loads this action produces more reliable commutation and prevents the output capacitor 35' from charging to a higher voltage which would be proportional to the peak transient spike voltage applied to the transformer.

One of the difficulties of a series capacitor commutated inverter circuit is that when the load varies over a wide range and the resistance R in the underdamped R-L-C circuit becomes small, the oscillations of the circuit incrementally increase the capacitor voltage to a high value and the peak voltage rating of the thyristors may be exceeded. This problem is solved in the D-C converter circuit of FIG. 5 by the addition of the feedback diodes across the load terminals of one of the thyristors. When the circuit conditions are such that the feedback diodes become forward biased, charge is removed from the commutating capacitor 34 and returned to the supply. This condition is reached, and the circuit enters the current limit mode of operation, when the voltage on the commutating capacitor $E_c$ is greater than the sum of the input voltage $E_1$ and the output voltage $E_2$ (assuming a transformer turns ratio of unity). After this natural current limit point or natural breakover point, each pulse of current through a thyristor pain, either the p thristors or the N thyristors, is followed immediately by a pulse through the feedback diodes across those thyristors and through the opposite pair of load rectifier diodes. This feeds some of the energy stored in the commutating capacitor back to the D-C supply and some into the load. The characteristics of the circuit following this change in its mode of operation depends upon the characteristics desired in the current limiting mode of operation, more particularly on whether the normal firing sequence for the thyristors is retained or whether the firing sequence is modified to allow the feedback pulse to be completed before resuming the firing sequence.

FIG. 7a shows the current in the circuit, drawn to an enlarged scale, when an overcurrent condition occurs, such as for instance due to a short circuit, and the circuit enters the current limit mode of operation but the normal firing sequence is retained. The normal half sine wave thyristor current pulses are shown in solid lines while the current produced when the circuit just passes the natural breakover point is shown in dotted lines. Let it be assumed that the thyristors P1 and P3 have been fired (load rectifier diodes 47 and 50 also conduct) and an oversized pulse of current flows through them, and at the end of this pulse the commutating capacitor 34 is charged to a peak voltage greater than the sum of the input and output voltages, as a result of which the feedback diodes 42 and 43 become forward biased. The beginning of a half sine wave of current which is of the opposite polarity and has a smaller peak amplitude is produced during the time $t_o$ by the series resonant circuit. The polarity on the primary and secondary windings 14p and 14s of the coupling transformer has also reversed so that the load rectifier diodes 48 and 49 are now conductive. The four diodes 42, 43, 48, and 49 conduct during the turn-off period $t_o$ at the end of which the thyristors N1 and N3 are turned on in the normal firing sequence. The feedback diodes 42 and 43 are now naturally commutated off since the current through them begins to fall when the thyristors N1 and N3 are turned on, and becomes zero after a short transition interval. During the next normal pulse interval the thyristors N1 and N3 conduct current as well as the load rectifier diodes 48 and 49. At the end of the modified half sine wave of current, the feedback diodes 44 and 45 become conductive and conduct current in the other positive polarity direction to return current to the D-C supply while the opposite pair of load rectifiers 47 and 50 supply current to the load 39. The complete cycle starts again with the firing of the thyristors P1 and P3 after the turn-off period $t_o$. It can be seen that the amount of current limiting that is produced depends upon the length of the turn-off period $t_o$. If the turn-off period $t_o$ is relatively short, the feedback diodes 42-45 conduct only for short intervals and remove only a small amount of charge from the commutating capacitor 34. If, on the other hand, the turn-off period $t_o$ is as large as one-fourth of the high frequency cycle, then a complete half sine wave of feedback current is permitted to flow through the circuit and the current limiting action is quite abrupt. This is illustrated in FIG. 8 which shows the output voltage-current characteristics during the period just before and after the natural breakover point at which current limiting begins. Curve 55 shows the characteristic followed before the natural breakover point 56 is reached at which the peak capacitor voltage is greater than the sum of the input and output voltages so that the feedback diodes become forward biased. Curve 57 represents a current limiting characteristic when the turn-off period $t_o$ is relatively short; steeper curve 58 is produced when the turn-off period $t_o$ is longer; and the relatively steep curve 59 indicates the fast current limiting action which results when a full half sine wave of feedback current is permitted.

As has been indicated, however, the circuit is more efficient when the turn-off period $t_o$ is as short as possible, i.e., is just equal to the minimum turn-off period for the thyristor which are used. A relatively efficient converter circuit having a fast current limiting action can be obtained by modifying the firing sequence of the thyristors to permit a complete feedback pulse of current before resuming the normal firing sequence. Two ways of doing this are shown in FIGS. 7b and 7c wherein there is shown the cautal current pulses in the circuit. In FIG. 7b, the normal firing sequence is interrupted when the feedback diodes 42, 43 and the load rectifier diodes 48, 49 become conductive to return current respectively to the D-C supply and to the load. The gating pulses normally supplied to the thyristors N1 and N3 are locked out or delayer during the feedback interval to permit a full half sine wave of feedback current to flow. The next normal gating pulses to the thyristors N1 and N3 are further delayed by the turn-off period $t_o$.

In FIG. 7c, the normal firing sequence is continued as soon as the feedback diodes 42 and 43 have conducted a full half sine wave of feedback current, i.e., the additional turn-off period $t_o$ is eliminated. This can be done since the feedback diodes 42 and 43 do not require a turn-off period as they are naturally commutated off when the thyristors N1 and N3 are fired. The average current in the circuit is somewhat greater in FIG. 7c than in FIG. 7b. In order to modify the normal firing sequence for the thyristors (see FIG. 5), the control circuit which includes the gating circuit 40' must additionally include a current limit lockout circuit 60 which temporarily inhibits the gating circuit 40' when an overcurrent is sensed and, following this time and until the feedback current pulse is completed, when there is any current in the circuit. This may be done, for instance, by a circuit 61 which senses the transformer current and actuates the current limit lockout circuit 62 to delay the firing pulses of the gating circuit 40' until the end of a complete half sine wave of feedback current. In this manner, by following the modified thyristor firing sequence indicated in FIGS. 7b and 7c, a fast current limiting action can be produced such as that shown by curve 59 in FIG. 8, while still retaining a relatively efficient circuit in which the turn-off period $t_o$ is at or near the minimum required. Another factor which influences the steepness of the characteristics 57–59 in FIG. 8 for the current limiting mode of operation is the amount of mutual inductance between the commutating inductors 28 and 29 and between 30 and 31 in the commutating circuit for the thyristors. The characteristic curves are less steep for a negative mutual inductance and more steep for a positive mutual inductance.

The double bridge converter circuit of FIG. 1 also has a current limit mode of operation, and the modifications to this circuit required for the current limit mode are illustrated in FIG. 9. FIG. 9 also shows an illustratory means for providing voltage regulation when the power converter circuit is used as an electronic transformer. In the current limit mode of operation, inverse-parallel thyristors in each pair which do not conduct during a normal mode half cycle are available for use as feedback rectifiers to limit current. For instance, if thyristors P1 and P3 (P5 and P7 on the other side) are conductive during the high frequency half cycle in which there is an overcurrent condition, then the other thyristors in these pairs, namely, thyristors P2 and P4 (N5 and N7 on the other side) are available to provide a path for the current limiting feedback pulse. In distinction from the case for the D-C to D-C converter of FIG. 5, the feedback action does not occur automatically and it is necessary to gate into conduction the feedback thyristors P2 and P4 and the corresponding thyristors N5 and N7 on the secondary side of the circuit. It is not necessary to wait until the end of the normal turn-off period $t_o$ before gating on the feedback thyristors, but may be done if it is desired. Since it is necessary to interpose some kind of modified firing sequence for the thyristors, inasmuch as the gating pulses for the feedback thyristors must be provided, the normal firing sequence for the thyristors is usually interrupted. The desired change in the mode of operation from the normal mode to the current limit mode is similar to that obtained naturally with the D-C to D-C converter of FIG. 5, except that the change should occur at a current level that is independent of the supply voltage. Otherwise, it would restrict the passage of reactive low frequency A-C current, which is high when the supply voltage is low.

For operation in the current limit mode, a suitable means for detecting the overcurrent is provided. The overcurrent is preferably detected by means of a small current transformer having a primary winding $62p$ in series with the commutating capacitor 34, so that the current transformer can be a small high frequency size having a high speed of response. It would be also possible to provide a potential transformer across the commutating capacitor 34 (the voltage is proportional to the current) or a current transformer in the low frequency A-C supply line or load line. The current transformer secondary winding $62s$ actuates an appropriate current limit gating modifying circuit 63 connected to the synchronized gating circuits 40. Since the power flow in the FIG. 9 circuit may be in either direction, it is also necessary to have a voltage signal input which enables the instantaneous direction of power flow to be determined. One way of obtaining this is to connect the primary winding $64p$ of a potential transformer across the high frequency coupling transformer primary winding $14p$, and the potential transformer secondary winding $64s$ is likewise coupled in a suitable manner to the logic circuits which form a portion of the current limit gating modifying circuit 63. It will be noted that for the current limit mode of operation it is desirable to have a completely symmetrical power converter circuit in which the output switching circuit 36 is identical to the mirror image of the input switching circuit 27 and in which the commutating capacitors and inductors are split evenly between the two circuits and arranged symmetrically in each circuit taken individually. The symmetrical double bridge circuit shown in FIG. 9 is the preferred arrangement.

FIGS. 10a and 10b show the current waveforms when the power converter circuit of FIG. 9 is operated in two different ways in the simple current limit mode in which a complete feedback pulse occurs before the next normal or power pulse is permitted. In FIG. 10a the normal turn-off period $t_o$ between each of the power and feedback pulses is maintained. The thyristors which are conductive to produce the various power and feedback pulses is somewhat similar to that described for the FIG. 5 circuit. Assuming that the odd P-group thyristors are turned on to produce a positive half cycle normal power pulse, at the end of this half sine wave of current the overcurrent condition is sensed and after the turn-off period $t_o$ the appropriate thyristors are turned on to produce the feedback pulse. The negative going feedback pulse is obtained by gating into conduction thyristors P2, P4, N5, and N7. The next normal negative going power pulse in the high frequency cycle is produced by turning on the odd N-group thyristors and the succeeding positive going feedback pulse is obtained by gating on thyristors N2, N4, P5, and P7. In FIG. 10b the normal turn-off period $t_o$ is not maintained between each of the power and feedback pulses, but rather only between one normal power pulse and its corresponding feedback pulse. Since in the example turning on thyristors N1 and N3 applies a reverse bias across the thyristors P2 and P4 which had been conducting the feedback pulse, it is not necessary to maintain the turn-off period $t_o$ between them. FIG. 10b produces a higher average current than FIG. 10a. By appropriate modification of the gating circuits it is also possible to operate the FIG. 9 circuit in the manner shown in FIGS. 7b and 7c.

The current limiting action achieved when the converter circuit of FIG. 9 is operated in the simple current limit mode in which a complete feedback half sine wave of current occurs is illustrated by the output voltage-current characteristics in FIG. 12. The circuit when operating in the normal mode in which the normal firing sequence of the thyristors is maintained operates along the curve 65. When the current increases and the natural breakover point 66 is reached (this is the same natural breakover point described with regard to the D-C to D-C converter of FIG. 5), operation in the current limiting mode may be commenced. It does not begin automatically, however, since in the absence of initiating the current limiting mode of operation the circuit operates along the straightline curve 65' which is a continuation of the curve 65, and the current limiting mode of operation can be started at any preselected point along the curve 65'. The action of the circuit after the start of the simple current limit mode of operation is shown by the curve 68 labeled $U_o = 1$. This characteristic is obtained when there is a feedback pulse following each normal pulse, however there may be other modes in which there are two or more normal pulses between each feedback pulse because of the manner in which the overcurrent is sensed. Assuming that the current limiting mode of operation is initiated at the natural breakover point 66, it is noted that in shifting from the normal mode curve 65 to the current limit curve 68 and back again there is a bistable loop portion 68' which operates in the directions as indicated by the arrows on the loop portions. Thus, there may be an undesirable bistable transition period between the normal mode of operation and the current limit mode when the full feedback pulse is produced before resuming the normal thyristor firing sequence.

To alleviate this problem, the converter circuit can be operated in the refined current limit mode in which the feedback pulse is terminated at a preselected point short of the completion of the full half sine wave. This is similar to the manner in which the normal firing sequence of the thyristors as shown in FIG. 7a for the D-C converter circuit of FIG. 5 is continued to cut short the feedback pulse through the feedback diodes. The FIG. 5 D-C to D-C converter circuit produces a single valued voltage-current characteristic (see FIG. 8) when no lock-out is employed to delay the firing of the next normal thyristor firing pulses; i.e., there is no bistable transition period.

Referring to the current waveforms for the circuit when operated in the refined current limit mode as shown in FIG. 11, there are three intervals in each complete half cycle identified as the feedback pulse, the transition intervale, and the normal pulse. The length or period of the feedback pulse is identified as $U_o$, where $U_o = 1$ indicates a complete half sine wave. The transition interval occurs when two thyristors connected in series circuit relationship across the input power supply terminals 25 and 26 are rendered conductive at the same time, to short circuit the supply terminals through the commutating inductors. Thus, if thyristors P1 and P3 are rendered conductive for a normal power pulse, and thyristors P2 and P4 are gated on for the feedback pulse following the turn-off time $t_o$, the turning on of the thyristors N1 and N3 for the next negative going power pulse means that thyristors P2 and N3 short circuit the supply through commutating inductors 28 and 29, while thyristors N1 and P4 short circuit the supply through commutating inductors 30 and 31. This occurs during the commutating interval for the thyristors P2 and P4, since the thyristors that conduct the feedback pulse are naturally commutated off when the next normal pulse thyristors are fired inasmuch as the feedback devices are subjected to reverse voltage as soon as the current is reduced to zero. The commutating inductors prevent instantaneous commutation of the current from the feedback devices to the newly fired thyristors. Hence, there is a transition interval in which both pairs of input side thyristors are conducting. In the output circuit, the same pair of thyristors that are gated on to conduct a feedback pulse remain in conduction throughout the transition interval and the following normal power pulse, and no other devices in the output circuit are gated on during this time. During the transition interval the commutating capacitor voltage is going through zero either in a positive going direction or a negative going direction. The delay time $t_o$ in FIG. 11 between the normal pulses and the succeeding feedback pulses can be omitted by option of the designer.

In FIG. 12, the curves 68a to 68d are respectively the output voltage-current characteristics produced by a converter operating from a D-C source in the refined current limit mode when $U_o=0.8$, $U_o=0.6$, $U_o=0.4$, and $U_o=0.2$. As can be expected, the shorter the duration of the feedback pulse before it is interrupted by firing the next pair of thryristors in the normal firing sequence, the less effective the current limiting action is and the less steep the current limiting curves become. Positive coupling of the inductances furthermore gives rise to a steeper current limit curve, but increases the peak voltage applied to the thyristors. Each of the characteristic curves 68a to 68d is subject to the deficiency of the previously discussed simple current limit mode curve 68, in that the transition between the normal mode and the refined current limit mode has a bistable nature. The bistability can be eliminated by omitting the delay time $t_o$ shown in FIG. 11 and selecting $U_o=t_o/(\pi\sqrt{LC})$, that is, the thyristors producing feedback are gated immediately after completion of each normal pulse, and the normal firing schedule is maintained, so that the circuit produces the same current waveform shown in FIG. 7a. To obtain a smooth transition between the normal mode and the refined current limit mode and to control the steepness of the characteristic, as shown by the curve 69, the current limiting action can be started at the natural break point 66 and the value of $U_o$ is smoothly increased from that value $t_o/(\pi\sqrt{LC})$ given by the circuit parameters at point 66 to the value of $U_o$ for the straight line portion of curve 69 as the short circuit condition is approached. To do this it is necessary to measure the load current and feed a suitable overcurrent signal to a controlled delay circuit for the gating pulse generators. This is shown in diagrammatic form in FIG. 9 in which the load current is an input to the current limit gating modifying circuit 63.

Voltage regulation for the power converter circuit of FIG. 9 can be obtained by employing a conventional automatic tap changing mechanism in conjunction with the high frequency coupling transformer 14. The tap changing mechanism 70 is shown here associated with the primary winding 14p and is effectively a movable tap which changes the turns ratio in accordance with the variations of the input voltage to produce a substantially constant output voltage. As will be illustrated in a later circuit, a static tap changer employing SCR's can also be used. Some degree of voltage regulation can also be obtained by varying the high frequency switching rate or chopping frequency $f$ of the inverter circuits since this changes the effective impedance values of the series elements in the series resonant circuit. A disadvantage to this method of voltage regulation, however, is that it reduces the efficiency of the converter circuit by inserting an additional equivalent resistance in series with the load.

Although the double bridge converter circuit shown in FIGS. 1 and 9 is the preferred embodiment of the invention, it has been pointed out that the frequency step-up and step-down switching circuits at either side of the high frequency coupling transformer are essentially inverter configurations, and inverter configurations other than the full bridge can be employed. It is not necessary that the same circuit configuration be used on both the primary side and the secondary side, and as was mentioned the commutating inductances and capacitances can be distributed unsymmetrically between the two circuits. FIG. 13 shows a power converter circuit in which the input switching circuit 75 is in the half bridge or voltage doubler circuit configuration, while the output switching circuit 76 is in the center-tap circuit configuration. The construction and operation of these circuits will be described only briefly, since they are well-known inverter circuit configurations described for example in chapter 5 of the book entitled "Principles of Inverter Circuits" by Bedford and Hoft, John Wiley Sons, Inc., copyright 1964, Library of Congress catalog card No. 64–20078. As with the converter circuits previously discussed, these converter circuits are operative with a wide range of resistive or reactive loads and can be operated to have complete reversibility of power flow according to the circuit conditions.

In FIG. 13, elements which function in essentially the same manner as in the FIG. 1 circuit are given the same reference numerals. The half bridge configuration requires only four unidirectional conducting thyristors or two bidirectional conducting thyristors, and is shown constructed with unidirectional conducting silicon controlled rectifiers. The first inverse-parallel thyristor pair P1 and P2 is connected in series with commutating inductors 77 and 78 and the second pair of inverse-parallel thyristors N1 and N2 across the input power supply terminals 25 and 26. The junction 79 between the commutating inductors is connected to one end of the high frequency coupling transformer primary winding 14p, and the other end of the coupling transformer is connected to the junction point 80 between two series connected commutating capacitors 81 and 82 which in turn are connected across the supply terminals 25 and 26. Gating on thyristor pair P1 and P2 causes the commutating capacitor 82 to charge towards the supply voltage, while the other commutating capacitor 81 discharges through the conducting thyristor P1. The series resonant commutating circuit develops a half sine wave current pulse, and the thyristor P1 is commutated off when the current falls to zero and the voltage at the junction point 79 between the two commutating inductors rises to a value above the supply voltage. When the thyristors N1 and N2 are alternately gated into conduction, the circuit operates in mirror image fashion to generate a half sine wave current pulse of opposite polarity.

The output frequency step-down circuit 76 includes a center-tapped autotransformer 83 having its center tap connected to the output terminal 37 and a commutating capacitor 84 connected across its two ends. The secondary winding of the high frequency coupling transformer 14 is divided into two parts, and a first series circuit comprising one secondary winding 14s, a commutating inductor 85, and the inverse-parallel connected thyristors P5 and P6 is connected between one end of the center-tapped autotransformer 83 and the output terminal 38. A second series circuit comprising the other secondary winding 14s', commutating inductor 85', and the inverse-parallel pair of thyristors N5 and N6 is connected between the other end of the autotransformer 83 and the output terminal 38. In this circuit arrangement the commutating capacitor 84 is alternately effectively in series circuit relationship with the first series circuit which includes the P-group thyristors and the second series circuit which includes the N-group thyristors. The power converter circuit of FIG. 13 is operated in exactly the same manner as has been described for the double bridge circuit configuration. The P-group thyristors and the N-group thyristors on both sides of the circuit are alternately rendered conductive in the normal mode of operation of the circuit, and the circuit can be operated in either the simple or refined current limit mode as previously described. The modifications required for current limiting and voltage regulation are not shown here.

FIG. 14 shows a power converter circuit useful as an electronic distribution transformer. The input switching circuit 86 is in the half bridge circuit configuration and is adapted to be connected to a source of high voltage. The pair of thyristors P1 and P2 is replaced by the four voltage sharing series connected thyristors P1a to P1d and the inverse-parallel connected group of series connected thyristors P2a to P2d. For voltage regulation purposes, thyristors P1d and P2d can be bypassed by the inverse-parallel thyristor pair P1d' and P2d' which are connected to the tap point 87 on the high frequency transformer primary winding 14p. In this form of static tap changer it will be noted that a complete duplication of all the voltage sharing thyristors is not necessary. The N thyristors are connected in similar fashion and comprise series connected thyristors N1a to N1d and N2a to N2d, and an additional inverse-parallel connected pair of thyristors N1d' and N2d' which are also connected to the tap point 87 for tap changing purposes.

The output switching circuit 88 in FIG. 14 is in the full bridge circuit configuration similar to the FIG. 1 circuit with the exception that the commutating capacitor is eliminated and all of the commutating capacitance appears in the circuit 86 on the primary side of the high frequency link transformer. The secondary transformer 14s is center-tapped and connected to a center-tap output terminal 89. The output filter capacitance is further divided between two filter capacitors 90 and 91, and their junction point 92 is connected to the center-tap terminal 89. With this output circuit arrangement, which is a type used on distribution transformers, unequal loads can be connected between the one set of terminals 37 and 89 and the second set 38 and 89. The operation of the power converter circuit of FIG. 14 is similar to that for the previous converter circuits and will not be further described.

FIG. 15 shows a power converter circuit which operates from a D-C or single phase A-C source of voltage but has a polyphase high frequency link. This reduces the size of the common input and output filter capacitors 35 and 35' or reduces the ripple across the input lines. The respective input terminals of three separate power converter circuits 95, 96, and 97 shown in block diagram form are connected in parallel with one another across the input supply terminals 25 and 26. The output terminals of each of these individual converter circuits are likewise connected across the common output terminals 37 and 38. The converter circuits 95, 96, and 97 are operated in three-phase fashion as indicated by the thyristor current waveforms within each of the blocks representing these converter circuits. The converter circuits may be in any of the circuit configurations previously described.

In the circuits described to this point, the output voltage follows the input voltage after undergoing the desired voltage transformation in the high frequency transformer link, i.e., there is a 0° phase shift between the input and output voltages. The power converter circuits, with the exception of the D-C to D-C converter as shown in FIG. 5, can be operated according to another method in order to produce selectively a 180° phase shift between the input and output voltages. When the source of supply voltage is a D-C source, the circuit can operate as an inverter and obtain power conversion from D-C to A-C of comparatively low frequency with an approximately square waveform. When the source of supply voltage is an A-C source, the circuit can operate in the manner of a cycloconverter to produce an A-C output voltage of a different frequency from the input voltage. It is also possible to vary the frequency of the output voltage, and the variable frequency and variable voltage power output is suitable for example for driving an A-C induction motor.

Figure 16:
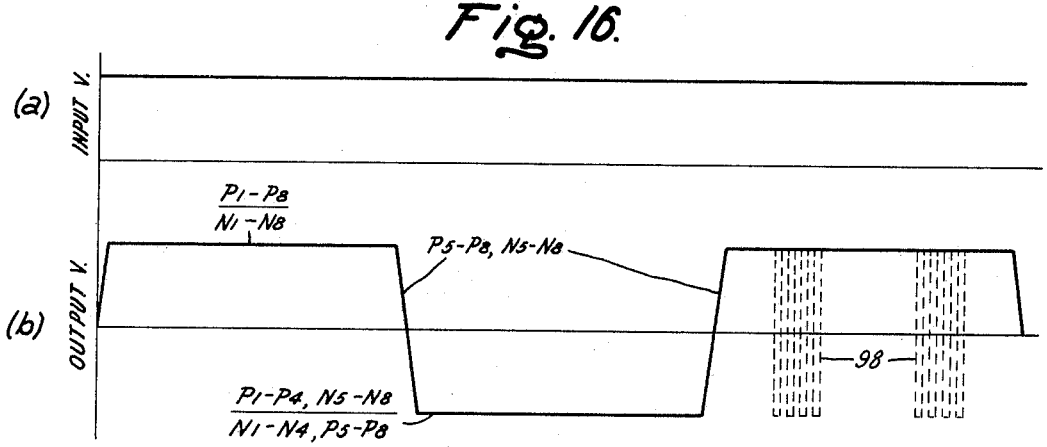

In the normal mode of operation of the preferred power converter circuit shown in FIG. 1, assuming that the voltage $e_1$ is a D-C source of voltage, the P-group thyristors and the N-group thyristors are fired in alternate chopping half cycles and the output voltage $e_2$ will also be D-C with the same polarity. In the inverter mode of operation, the normal mode of firing is temporarily interrupted and the polarity of the output voltage $e_2$ is reversed by gating the thyristors on the output side to reverse the polarity of the charge on the output filter capacitor 35', and then a firing sequence is resumed in which opposing groups of thyristors in the input and output circuits are fired synchronously. Typical waveforms are shown in FIG. 16. In FIG. 16a, the input voltage has a positive polarity applied such that the input suppply terminal 25 is positive with respect to the terminal 26. During the positive half cycle of the output volage (see FIG. 16b) the converter circuit is operated according to the normal mode of operation in which the P-group thyristors on both sides of the circuit and the N-group thyristors on both sides are alternately gated into conduction. Output terminal 37 is positive with respect to terminal 38. (In the figure, the thyristors fired during each high frequency half cycle are separated by a horizontal line.) To reverse the polarity of the output voltage at the desired point, the normal mode of firing is temporarily interrupted. Gate trigger pulses are removed from all of the thyristors on the input side 27 and, at the same time, all the thyristors on the output side 36 are triggered together. The output filter capacitor 35' discharges and recharges to the opposite polarity through the thyristors N6 and P8, and also P6 and N8, in the output circuit 36. An alternate method of triggering this reversal is to fire these four thyristors only; the other complementary four thyristors are fired to again reverse the output polarity to its original state at the beginning of the next output cycle. If all eight of the output side thyristor devices are fired at the end of each half cycle, only half of them will conduct at any one time, but the control circuit may be simpler. During the next negative output half cycle when the output voltage $e_2$ is negative at the output terminal 37 and positive at the terminal 38, the normal mode of triggering is resumed except that thyristors N5 to N8 on the output side are fired at the same time as the thyristors P1 to P4 on the input side, and in the alternate chopping high frequency half cycles the devices P5 to P8 on the output side are fired at the same time as the devices N1 to N4 on the input side.

To minimize the current pulses through the output side thyristors when the charge on the output filter capacitor 35' is reversed, it is desirable to have capacitor 35' as small in capacitance as possible and to have inductance in series with the load 39. In many cases, the load itself will have sufficient inductance. Proper coupling of the commutating inductances on the output side will also aid in reducing the magnitude and extending the time of the polarity reversal current pulse. To reduce the size of the output filter capacitor 35', a polyphase frequency link is desirable as shown in FIG. 15. When operated as an inverter in this manner, the high frequency transformer provides voltage transformation and isolation in a small package, and this is particularly advantageous when the desired A-C output frequency is very low, e.g., in the range of 1 Hz. to 60 Hz. In this mode of operation the positive and negative half cycles of the low frequency output may be of the same or of unequal duration, and if of unequal duration there is a long time average D-C component in the output, the magnitude of which can be controlled by time ratio control techniques. Moreover, the magnitude of the low frequency output can be controlled by including a number of polarity reversals within each low frequency half cycle, as indicated at 98. Within each of the sections 98, the magnitude of the output voltage is determined by time ratio control principles in that the ratio of the time during which a positive polarity output voltage is obtained to the time during which a negative output polarity voltage is obtained determines the average voltage in each section.

Figure 17:
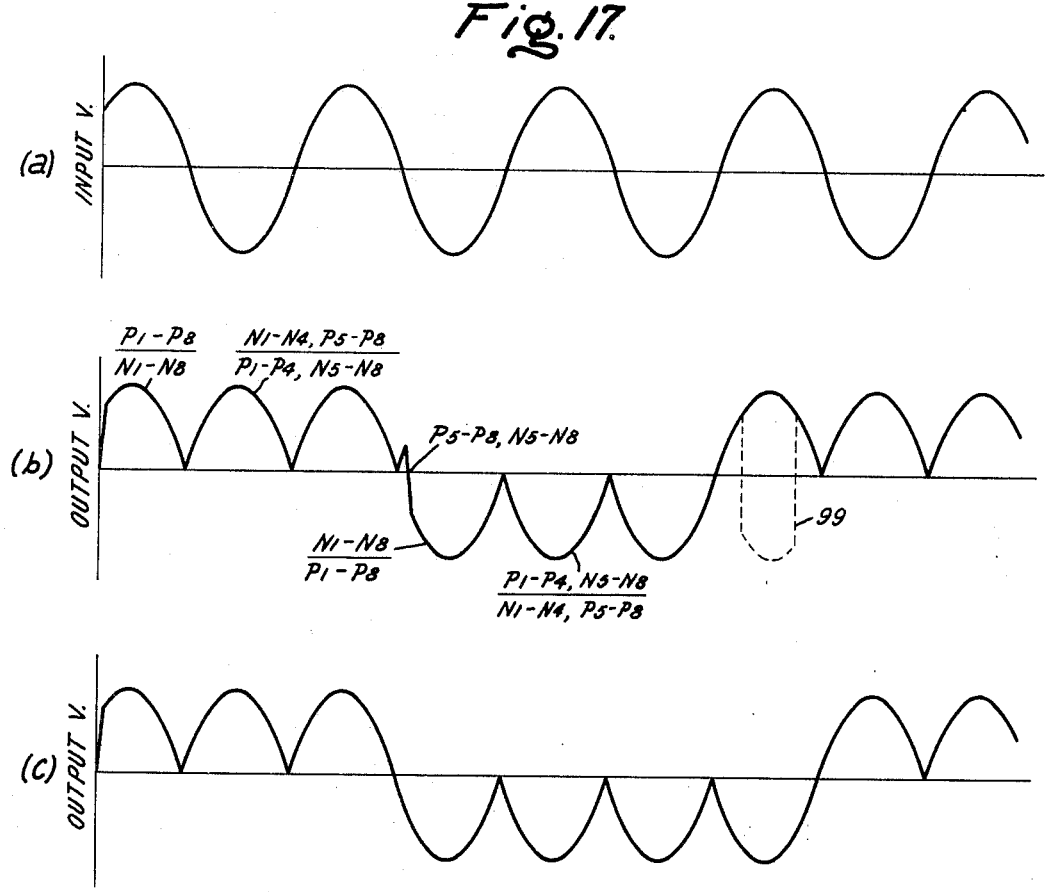

When the supply voltage is a unipolarity D-C supply, one group of thyristors on the input side can be replaced by rectifier diodes. For example, if the polarity of the D-C supply is such that the terminal 25 is always positive with respect to the terminal 26, the thyristors P2, P4, N2, and N4 can be replaced by rectifier diodes. With a full set of thyristors, i.e., eight on each side, the supply may be A-C and the circuit may be operated as cycloconverter to produce an output A-C frequency which is lower than the input A-C frequency. Illustratory waveforms are shown in FIG. 17, where the A-C input voltage as shown in FIG. 17a is for instance a 60 Hz. wave. The type of square wave output voltage typically produced is shown in FIG. 17b. During the first positive half cycle of the input voltage, the output voltage is also positive and is obtained by gating the P-group and N-group thyristors alternately in the normal mode of operation. During the first negative half cycle of the input voltage, the output voltage is also positive in polarity and is obtained by gating thyristors N1 to N4 on the input side and thyristors P5 to P8 on the output side (thyristors N2, N4, P5, and P7 actually conduct current when the power flow is from input to output). On the other high frequency half cycle, thyristors P1 to P4 and N5 to N8 are fired (P4, P2, N5, and N7 actually conduct when power is being delivered to the load). This mode of operation is continued until it is desired to change the polarity of the output voltage. This can be done at the end of a half cycle of the input voltage as shown in FIG. 17c or can occur in the middle of a half cycle as shown in FIG. 17b. In this case, it is necessary to reverse the polarity of the charge on the output filter capacitor 35′ by gating on for conduction all of the thyristors on the output side 36 of the circuit, namely, thyristors P5 to P8 and N5 to N8. Where the input voltage polarity is negative and the output voltage polarity is also negative, the N-group thyristors and P-group thyristors are fired alternately in the normal manner. To obtain a negative output voltage when the input voltage is positive, thyristors P1 to P4 and N5 to N8 are fired alternately with thyristors N1 to N4 and P5 to P8. The firing sequence to be followed is summarized in the following table:

| Input Voltage Polarity | Output Voltage Polarity | |
|---|---|---|
| | Positive | Negative |
| Positive | $\dfrac{P1-P1}{N1-N1}$ | $\dfrac{P1-P4,\ N5-N8}{N1-N4,\ P5-P8}$ |
| Negative | $\dfrac{N1-N4,\ P5-P8}{P1-P4,\ N5-N8}$ | $\dfrac{N1-N8}{P1-P8}$ |

The duration of each output voltage half cycle may be the same or may be unequal as illustrated in FIG. 17c. In this example the positive output voltage half cycle comprises three of the input voltage half cycles, while the negative output voltage half cycle comprises four of the input voltage half cycles. It is also possible to control the magnitude of the low frequency output by including a number of polarity reversals within each low frequency half cycle, as is shown in outline form in FIG. 17b at 99, and is accomplished in exactly the same manner as has been described with regard to the case when a D-C source of supply voltage is used (sections 98 in FIG. 16b). When operated from an A-C supply, it will be noted that the converter circuit arrangement can be considered to be a double cycloconverter with a high frequency link. When operated from a D-C supply, the input side may be regarded as a high frequency inverter and the output side as a type of cycloconverter.

Further variations are possible using the basic power converter circuit as the building block. For example, the high frequency transformer can have more than one secondary winding each connected in a separate secondary side converter circuit supplying its own load. In another variation, three similar converters each operating from a D-C or single phase A-C supply can be controlled to provide a three-phase output. Each converter in turn may consist of a polyphase link (see FIG. 15). A larger system suitable for high power applications which lends itself to modular construction and which operates from a three-phase input supply comprises three converters, one from each of the input phases, to drive each phase of a three-phase output for a total of nine converters. Each of these converters in turn may contain a three-phase high frequency link, for a total of twenty-seven separate converter circuits.

The circuit arrangement shown in FIG. 18 uses three power converter circuits, operates from a three-phase input supply, and has a single phase output frequency which can be higher or lower than the input frequency. The primary sides 100p, 101p, and 102p of the three converter circuits are connected across the three-phase input supply lines A, B, and C in the usual polyphase fashion. The secondary sides 100s, 102s, and 101s are connected in series circuit relationship across the single phase output terminals 103 and 104. The dashed lines represent the high frequency transformer links between the corresponding primary and secondary circuits. Output filter capacitors 105 are connected in series across the terminals 103 and 104 to smooth the pulsed output power.

FIG. 19a shows the waveform of the three-phase input voltage wherein the single phase A-C voltages are designated as $e_a$, $e_b$, and $e_c$. As shown in FIG. 19b, seven different output voltage levels are available at any instant, and may be selected by appropriate control of the thyristor firing sequences. The seven different output voltage levels are obtained because the output voltage $e_o = \pm e_a \pm e_b \pm e_c$, assuming unity turns ratio for each of the high frequency link transformers. Possible switching sequences to generate desired output voltages at frequencies higher or lower than the input frequency are illustrated. The curve 106 designates the filtered substantially sine wave output voltage obtained when the thyristors in the various converters are fired to obtain the jagged output voltage wave shape shown in heavy lines. In the first half of FIG. 19b, the output frequency is higher than the input frequency, and in the second half a different firing sequence is selected and the output frequency is lower than the input frequency.

For converter circuits operating in the manner of an inverter or a cycloconverter, the normal modes of operation which have been described can be interrupted when an overload or fault condition occurs, and the firing sequence of the thyristors can be changed to produce current limiting operation in the manner of the simple current limit mode or of the refined current limit mode previously described for a converter operating as an electronic transformer. To accomplish this action, suitable means of measuring the currents and voltages in the power circuit are necessary, and the control circuit is adapted to respond in the desired manner to the measured quantities. Also, the link between the source and load can be broken at any desired time by simply removing the gating signals from all or a sufficient number of the thyristors in the converter circuit, which so operates in the manner of a static circuit breaker. This is a desirable function when sustained overloads or persistent faults occur, or for the normal on-off control of the load.

In summary, the new power converter circuits employ a high frequency linear transformer link and use bidirectional conducting thyristor means in various inverter configurations to convert a D-C voltage or relatively low frequency A-C voltage to a high frequency wave which is transformed and reconstructed with 0° or 180° phase shift at the other side of the transformer by the same or equivalent inverter configurations. Some simplification is possible by replacing thyristors with diodes when the source is a unipolarity D-C voltage. The thyristors are commutated by series capacitor commutation, and all internal currents are essentially half sine wave pulses. With the full set of thyristors on each side of the transformers, reversible power flow is possible and reliable commutation is obtained for a wide range of resistive and reactive loads. The converter circuits can be operated by using different methods to control the gating of the thyristors so that the circuit performs as an electronic transformer, as an inverter, or as a cycloconverter. There is additionally a simple current limit mode of operation in which a full feedback pulse is permitted before resuming the normal firing sequence, and a refined current limit mode in which the feedback pulse is interrupted at a desired point. Voltage regulation means can also be incorporated into the circuit if desired.

While the invention has been particularly shown and described with reference to several preferred embodiments thereof, it will be understood by those skilled in the art that various other changes in form and details may be made therein without departing from the spirit and scope of the invention.

What I claim as new and desire to secure by Letters Patent of the United States is:

1. A power converter circuit comprising the combination of
   a high frequency linear transformer having a pair of inductively coupled windings,
   a first inverter switching circuit including at least a pair of alternately conductive solid state switching devices each of which is effectively connected in series circuit relationship with at least a portion of one of said transformer windings across a first pair of terminals in which appears an electric potential,
   a second switching circuit including at least a pair of alternately conductive solid state switching devices each of which is effectively connected in series circuit relationship with at least a portion of the other transformer winding across a second pair of terminals,
   means for synchronously rendering conductive at least one of the devices in each of the switching circuits, and for alternately and synchronously rendering conductive at least one of the other devices in each of the switching circuits at a high frequency switching rate which is relatively high compared to the frequency of the electric potential appearing in said first pair of terminals,
   said first and second switching circuits further including series capacitor commutation means comprising commutating inductor means effectively coupled in series circuit relationship with commutating capacitor means and tuned to series resonance at a frequency greater than said high frequency switching rate for developing half sine wave current pulses of opposite polarity and for alternately commutating off said devices,
   whereby the electric potential appearing in the first pair of terminals is converted to a high frequency wave and reformed in the desired manner at the second pair of terminals.

2. A circuit as defined in claim 1 further including a filter capacitor connected across at least one of the pairs of terminals, and
   a load connected across one of the pairs of terminals.

3. A circuit as defined in claim 1 wherein said power converter circuit has a polyphase high frequency link and includes a plurality of converter circuits as set forth in claim 1 connected in polyphase fashion between a single pair of said input and output terminals, and further including
   a filter capacitor connected between each of said pairs of terminals.

4. A circuit as defined in claim 1 further including a filter capacitor connected across each of the pairs of terminals, wherein the effective capacitance of each filter capacitor is a magnitude larger than the capacitance of the commutating capacitor means.

5. A circuit as defined in claim 4 wherein the solid state switching devices in the first and second switching circuits are nongate turn-off thyristor devices, and the second switching circuit has an inverter circuit configuration.

6. A circuit as defined in claim 4 wherein the solid state switching devices in the second switching circuit comprise a plurality of similarly poled diodes arranged as a single phase rectifier to produce a unidirectional potential between the second pair of terminals, and
   the solid state switching devices in the first inverter switching circuit are silicon controlled rectifiers.

7. A circuit as defined in claim 4 wherein
   the first pair of terminals are input terminals and the potential appearing therein is a unidirectional potential, and the second pair of terminals are output terminals,
   the solid state switching devices in the second switching circuit comprise a plurality of similarly poled diodes arranged as a single phase rectifier to produce a unidirectional potential between the output terminals, and
   the solid state switching devices in the first inverter switching circuit are silicon controlled rectifiers each of which additionally has an oppositely poled solid state feedback diode connected across the load terminals thereof to return power from the series capacitor commutating means to the input terminals when an overvoltage occurs in said series capacitor commutation means and the feedback diodes become forward biased, to thereby limit the current in the circuit.

8. A circuit as defined in claim 7 wherein
   said series capacitor commutation means is completely included in the first inverter switching circuit and further includes another series circuit comprising an additional commutating inductor and capacitor tuned to series resonance at a frequency approximately twice that of the high frequency switching rate to thereby provide reliable commutation under high impedance load conditions.

9. A power converter circuit comprising the combination of
   a high frequency linear transformer having a plurality of inductively coupled windings,
   a first inverter switching circuit including at least a pair of bidirectional conducting thyristor means each of which is effectively connected in series circuit relationship with one of said transformer windings across a first pair of terminals in which appears an electric potential,
   a second inverter configuration switching circuit including at least a pair of bidirectional conducting thyristor means each of which is effectively connected in series circuit relationship with another of said transformer windings across a second pair of terminals, and
   gating means for synchronously rendering conductive at least one of the thyristor means in each of the switching circuits for conduction of current therethrough in a selected direction, and for alternately and synchronously rendering conductive at least one of the other thyristor means in each of the switching circuits for conduction of current therethrough in a selected direction, said synchronously conducting pairs of thyristor means being switched in a normal mode of operation at a high frequency switching rate which is relatively high compared to the frequency of the electric potential appearing in said first pair of terminals, said first and second switching circuits further including series capacitor commutation means comprising commutating inductor means effectively coupled in series circuit relationship with commutating capacitor means and tuned to series resonance at a frequency greater than the high frequency switching rate of the switching circuits for developing half sine wave current pulses of opposite polarity and for alternately commutating off said thyristor means, whereby the unidirectional or low frequency alternating current potential appearing in the first pair of terminals is converted to a high frequency wave and reformed in the desired manner at the second pair of terminals.

10. A circuit as defined in claim 9 further including a filter capacitor connected across at least one of said pairs of terminals, and
a load connected across one of said pairs of terminals.

11. A circuit as defined in claim 9 wherein
each of said bidirectional conducting thyristor means comprises a pair of inverse parallel connected silicon controlled rectifiers, and further including,
a filter capacitor connected across each of the pairs of terminals, wherein the effective capacitance of each filter capacitor is a magnitude larger than the capacitance of the commutating capacitor means.

12. A circuit as defined in claim 9 wherein said first and second inverter switching circuits are identical in configuration, and
said commutating inductor and capacitor means included in series capacitor commutation means for commutating off said thyristor means comprises a plurality of commutating inductors and capacitors distributed symmetrically between said first and second switching circuits.

13. A circuit as defined in claim 9 further including means for sensing an overcurrent in said power converter circuit, and
means for modifying the normal mode of operation of said gating means when an overcurrent condition is sensed to render conductive at least one previously conducting bidirectional thyristor means in one of the switching circuits for conduction of current therethrough in the reverse direction and to synchronously render conductive at least one thyristor means in the other switching circuit to remove excess charge from the commutating capacitor means.

14. A circuit as defined in claim 9 further including
means for sensing an overcurrent in said power converter circuit,
means for sensing the direction of power flow in said power converter circuit, and
means for modifying the normal mode of operation of said gating means when an overcurrent condition is sensed to render conductive at least one previously conducting bidirectional thyristor means in the switching circuit delivering excess energy to the series capacitor commutation means for conduction of current therethrough in the reverse direction and to synchronously render conductive at least one previously nonconducting thyristor means in the other switching circuit to return power from the series capacitor commutation means to both pairs of terminals.

15. A circuit as defined in claim 9 further including
voltage regulation means for regulating the voltage supplied to said output terminals, and
current limiting means for limiting the current in said power converter circuit at a predetermined point on the output voltage-current characteristic.

16. A circuit as defined in claim 9 wherein said power converter circuit comprises three of the converter circuits as set forth in claim 9, the first pair of terminals of each of the first inverter switching circuits of the three converter circuits being connected in three-phase fashion across the lines of a three-phase A-C supply voltage, while the second pair of terminals of the second inverter configuration switching circuits are connected in series circuit relationship across a pair of D-C or single phase A-C output lines, and
filter capacitor means connected across said output lines,
whereby the frequency of the output voltage can be selected to be greater or less than the frequency of the A-C supply voltage by appropriately selecting the gating sequence for the thyristor means in the three converter circuits.

17. A power converted circuit comprising the combination of
a high frequency linear transformer having a pair of inductively coupled windings,
a first full bridge inverter switching circuit including two pairs of nongate turn-off bidirectional conducting thyristor means wherein each pair of said thyristor means is effectively connected in series circuit relationship with one of said transformer windings across a first pair of terminals in which appears an electric potential,
a second full bridge inverter configuration switching circuit including two pairs of nongate turn-off bidirectional conducting thyristor means wherein each pair of said thyristor means is effectively connected in series circuit relationship with the other transformer winding across a second pair of terminals,
gating means for synchronously rendering conductive one selected pair of the thyristor means in each of the switching circuits for conduction of current therethrough in a selected direction, and for alternately and synchronously rendering conductive another selected pair of the thyristor means in each of the switching circuits for conduction of current therethrough in a selected direction, said synchronously conducting pairs of thyristor means being switched in a normal mode of operation at a high frequency switching rate which is relatively high compared to the frequency of the electric potential appearing in said input terminals,
said first and second switching circuits further including series capacitor commutation means comprising commutating inductor means effectively coupled in series circuit relationship with commutating capacitor means and tuned to series resonance at a frequency greater than the high frequency switching rate of the inverter switching circuits for developing half sine wave current pulses of opposite polarity and for alternately commutating off said thyristor means, and
a filter capacitor connected across each of said pairs of terminals,
whereby the unidirectional or low frequency A-C potential appearing in the first pair of terminals is converted to a high frequency wave and reformed in the desired manner at the second pair of terminals.

18. A circuit as defined in claim 17 wherein said commutating inductor and capacitor means comprises a plurality of commutating inductors and commutating capacitors, and
said first and second switching circuits are symmetrical and each of the series connected circuits within each of the switching circuits comprises the series combination of one of said bidirectional conducting thyristor means, one commutating inductor, one commutating capacitor, the transformer winding, another commutating inductor, and another bidirectional conducting thyristor means.

19. A circuit as defined in claim 17 wherein each of said nongate turn-off bidirectional conducting thyristor means includes a pair of inverse parallel connected silicon controlled rectifiers, and said power converter circuit further includes
means for sensing an overcurrent in said power converter circuit, and means for modifying the normal mode of operation of said gating means when an overcurrent condition is sensed to render conductive at least one silicon controlled rectifier in one of the switching circuits which is respectively connected in inverse parallel relation with a previously conducting silicon controlled rectifier and to synchronously render conductive at least one previously nonconducting silicon controlled rectifier in the other switching circuit to return power from the capacitor commutation means to both pairs of terminals.

20. The method of operating a power converter circuit comprising a high frequency linear transformer having inductively coupled windings, a first inverter switching circuit comprising first and second bidirectional conducting thyristor means each effectively connected in series circuit relationship with one transformer winding across a first pair of terminals in which appears an electric potential, a second inverter configuration switching circuit comprising third and fourth bidirectional conducting thyristor means each effectively connected in series circuit relationship with another transformer winding across a second pair of terminals, a filter capacitor connected across each of said pairs of terminals, gating means for rendering conductive said bidirectional conducting thyristor means at a high frequency switching rate, and series capacitor commutation means included in said first and second switching circuits and comprising commutating inductor means connected in series circuit relationship with commutating capacitor means and tuned to series resonance at a frequency greater than the high frequency switching rate of said switching circuits for developing half sine wave current pulses of opposite polarity and for alternately commutating off said thyristor means, said method comprising the steps of synchronously rendering conductive one of the bidirectional conducting thyristor means in each of the switching circuits for current flow through each said thyristor means in a selected direction, alternately and synchronously rendering conductive the other bidirectional conducting thyristor means in each of the switching circuits for current flow through each said thyristor means in a selected direction, and repeating this sequence of operations at the high frequency switching rate of the switching circuits to thereby convert the unidirectional or low frequency A-C electric potential appearing in the first pair of terminals to a high frequency wave which is transformed and reformed in the desired manner at the second pair of terminals.

21. The method of operating a power converter circuit as set forth in claim 20 including the additional steps of sensing an overcurrent in said power converter circuit, and temporarily interrupting the normal mode of operation as defined in claim 20 when an overcurrent condition occurs and rendering conductive a previously conducting thyristor means in one of said switching circuits and synchronously rendering conductive a previously nonconducting thyristor means in the other of said switching circuits for conduction of a complete half sine wave pulse of current of the opposite polarity through the transformer windings in the reverse direction to return power from the series capacitor commutation means to both pairs of terminals, and resuming the normal mode of operation of the thyristor means.

22. The method of operating a power converter circuit as set forth in claim 20 including the additional steps of sensing an overcurrent in said power converter circuit, and temporarily interrupting the normal mode of operation as defined in claim 20 when an overcurrent condition occurs and rendering conductive a previously conducting thyristor means in one of said switching circuits and synchronously rendering conductive a previously nonconducting thyristor means in the other of said switching circuits for conduction of a portion of a half sine wave pulse of current of the opposite polarity through the transformer windings in the reverse direction to return power from the series capacitor commutation means to both pairs of terminals, and resuming the normal mode of operation of the thyristor means before completion of the opposite polarity current pulse.

23. The method of operating a power converter circuit as set forth in claim 20 wherein the input electric potential appearing in said first pair of terminals is a unidirectional potential, and said first and third thyristor means are rendered conductive synchronously, and said second and fourth thyristor means are rendered conductive alternately and synchronously at the high frequency switching rate to reconstruct the input electric potential at the second pair of terminals with a selected polarity, this sequence of operations being continued for a desired interval of time, rendering conductive the thyristor means in said second inverter configuration to discharge and recharge to the opposite polarity the filter capacitor connected across said output terminals, and then synchronously rendering conductive said first and fourth thyristor means, and alternately and synchronously rendering conductive said second and third thyristor means at the high frequency switching rate to reconstruct the input electric potential at the second pair of terminals with the opposite polarity.

24. The method of operating a power converter circuit as set forth in claim 20 wherein the input electric potential appearing in said first pair of terminals is a low frequency A-C potential, and during one half cycle of the input electric potential said first and third thyristor means are rendered conductive synchronously, and said second and fourth thyristor means are rendered conductive alternately and synchronously at the high frequency switching rate to reconstruct the input electric potential at the second pair of terminals with 0° phase shift, and during the other half cycle of the input electric potential, said first and fourth thyristor means are rendered conductive synchronously at the high frequency switching rate, and said second and third thyristor means are rendered conductive alternately and synchronously to reconstruct the input electric potential at the second pair of terminals with 180° phase shift.

25. The method of operating a power converter circuit as set forth in claim 24 further including the step of temporarily interrupting the above mentioned sequence of operations during an input electric potential half cycle, rendering conductive the thyristor means in the second inverter configuration switching circuit to discharge and recharge to the opposite polarity the filter capacitor connected across the second pair of terminals, and resuming a similar sequence of operations in which the output voltage has the opposite polarity.

References Cited

UNITED STATES PATENTS

| | | | |
|---|---|---|---|
| 2,867,731 | 1/1959 | Henszey | 321—65 XR |
| 2,907,944 | 10/1959 | Hume | 321—69 |
| 3,027,522 | 3/1962 | Boxall et al. | 330—10 XR |
| 3,246,231 | 4/1966 | Clarke | 321—69 |
| 3,319,147 | 5/1967 | Mapham | 321—60 XR |

LEE T. HIX, Primary Examiner

W. M. SHOOP, Jr., Assistant Examiner

U.S. Cl. X.R.

321—60, 69